US011734285B2

(12) United States Patent
Bortnikov et al.

(10) Patent No.: US 11,734,285 B2
(45) Date of Patent: Aug. 22, 2023

(54) SYSTEM AND METHOD FOR TOP-K SEARCHING USING PARALLEL PROCESSING

(71) Applicant: VERIZON PATENT AND LICENSING INC., Basking Ridge, NJ (US)

(72) Inventors: Edward Bortnikov, Haifa (IL); David Carmel, Haifa (IL); Gali Sheffi, Kiryat Bialik (IL); Idit Keidar, Haifa (IL); Dmitry Basin, Haifa (IL)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 482 days.

(21) Appl. No.: 15/928,723

(22) Filed: Mar. 22, 2018

(65) Prior Publication Data
US 2019/0294691 A1 Sep. 26, 2019

(51) Int. Cl.
*G06F 16/2457* (2019.01)
*G06F 16/93* (2019.01)
*G06F 16/248* (2019.01)
*G06F 16/951* (2019.01)

(52) U.S. Cl.
CPC ...... *G06F 16/24578* (2019.01); *G06F 16/248* (2019.01); *G06F 16/93* (2019.01); *G06F 16/951* (2019.01)

(58) Field of Classification Search
CPC .. G06F 16/24578; G06F 16/248; G06F 16/93; G06F 16/951

USPC ........................................................ 707/728
See application file for complete search history.

(56) References Cited

U.S. PATENT DOCUMENTS

| | | | |
|---|---|---|---|
| 2004/0243557 A1* | 12/2004 | Broder | G06F 40/30 |
| 2011/0087684 A1* | 4/2011 | Junqueira | G06F 16/24532 707/764 |
| 2012/0130996 A1* | 5/2012 | Risvik | G06F 16/24578 707/723 |

OTHER PUBLICATIONS

Bonacic et al., "Improving Search Engines Performance on Multi-threading Processors". 8th International Conference, Toulouse, France, Jun. 24-27, 2008. (Year: 2008).*

* cited by examiner

*Primary Examiner* — Apu M Mofiz
*Assistant Examiner* — Husam Turki Samara

(57) ABSTRACT

Methods, systems, and programming for retrieving content items for a search are described herein. In a non-limiting embodiment, a query including a plurality of terms may be received. For each of the plurality of terms, a posting list of one or more content items may be obtained. The posting list may include a ranked list of term scores corresponding to the one or more content items, each of the term scores being indicative of a level of relevance of a corresponding content item to a term associated with the posting list. A list of relevant content items for the query may be determined based on the term scores in each posting list for the one or more content items identified with respect to each term. At least one of the relevant content items may be provided as a response to the query.

20 Claims, 23 Drawing Sheets

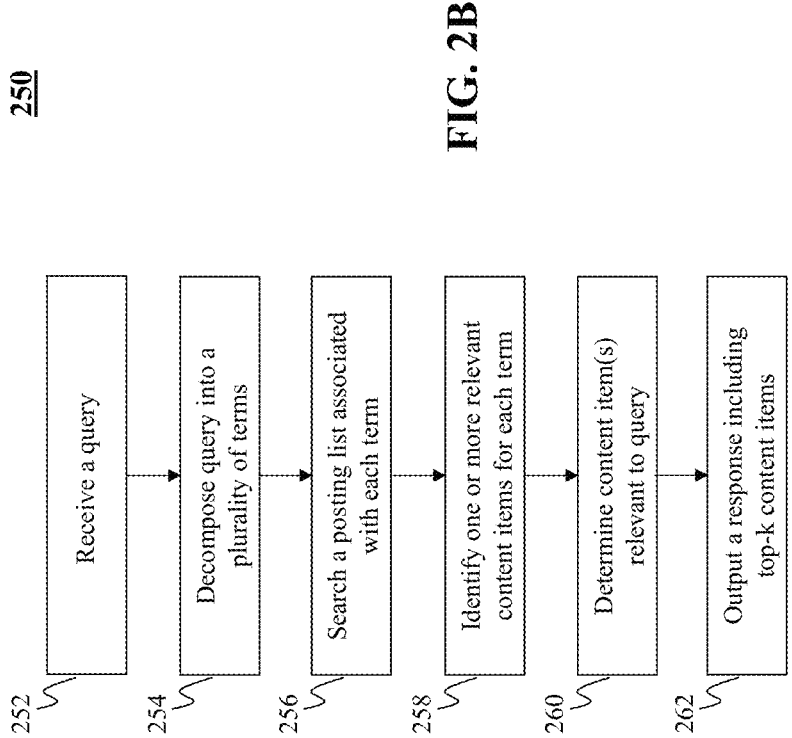

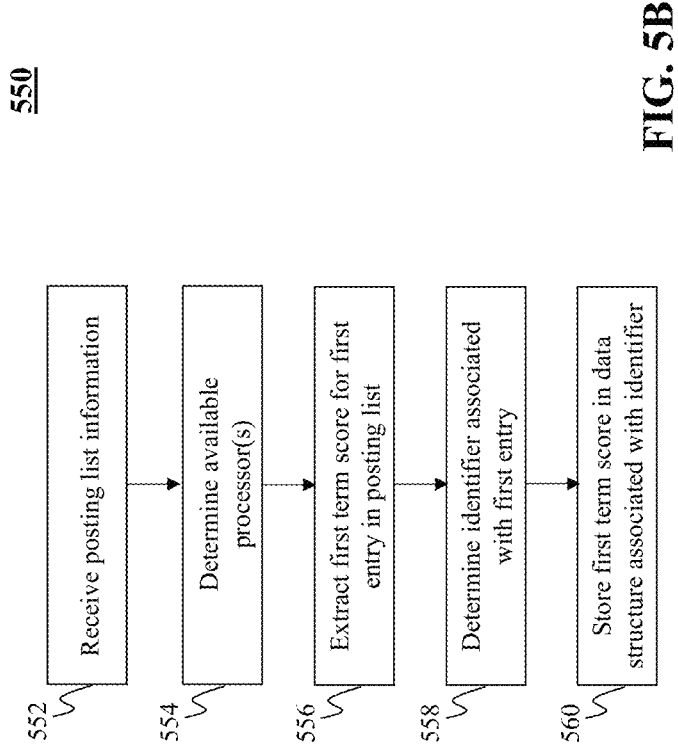

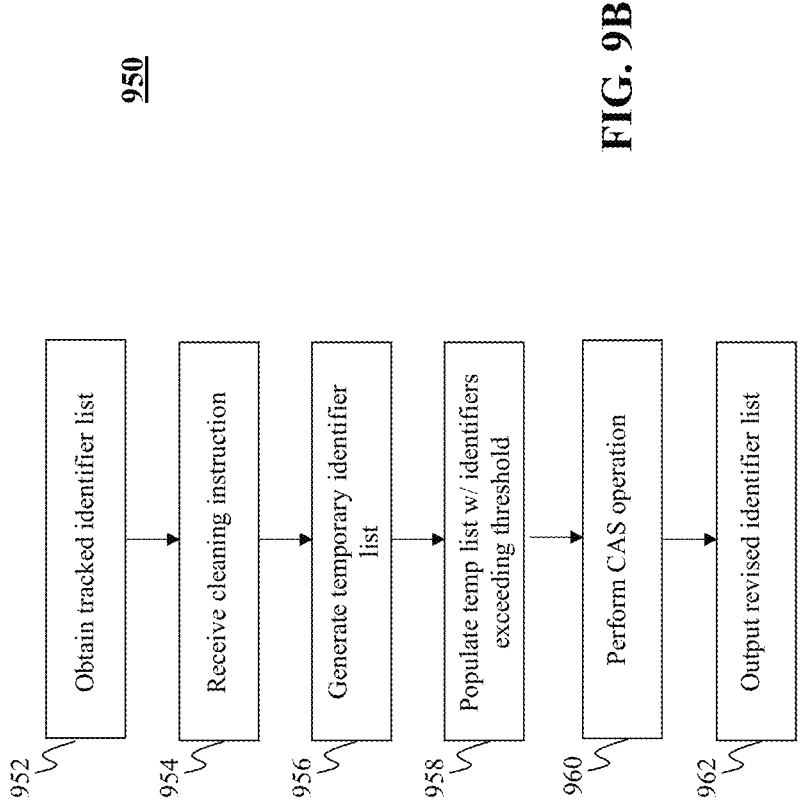

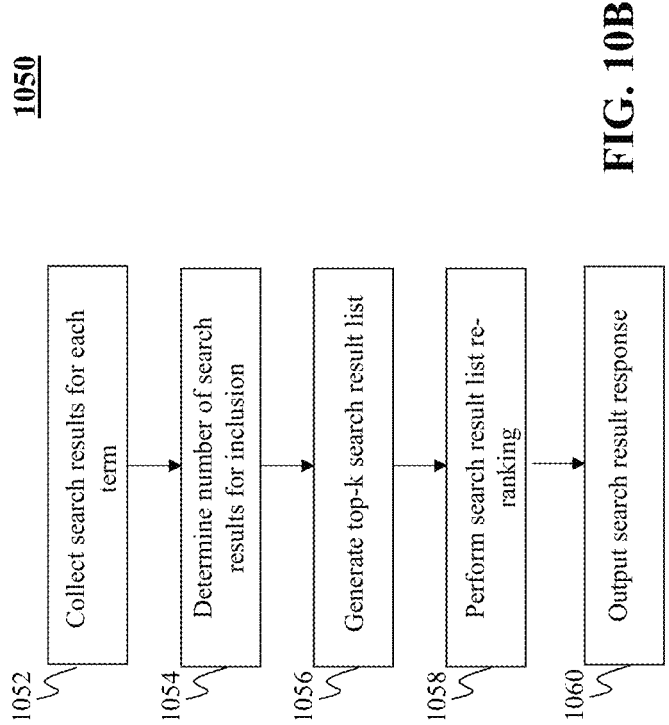

SYSTEM AND METHOD FOR TOP-K SEARCHING USING PARALLEL PROCESSING

BACKGROUND

1. Technical Field

The present teaching generally relates to searching. More specifically, the present teaching relates to systems, methods, and programming for performing top-k searching using parallel processing capabilities.

2. Technical Background

Searching for information is one of the core resources of the Internet. Typically, an individual will input a query into a search engine, and the search engine will before a search of the various content accessible across the Internet to obtain search results for the query. The search results may include content deemed by the search engine to be most relevant to the particular query. Typically, the search results correspond to links to content items (e.g., uniform resource locators ("URLs")), however one or more content items (e.g., images, PDF documents, and/or information) may also be included within the search results.

To select the best search results (e.g., links to the content items and/or the one or more content items) from the vast possible options that the Internet affords, most search engines implement a two-stage search process. The first stage may involve a course top-k result retrieval. To perform this process, the query, as well as additional information (e.g., search history, location, user preferences, etc.) may be analyzed, and a top-k content items may be identified that are deemed most relevant to the query. In some embodiments, one or more relevance scoring functions may be used to identify how relevant each content item is to the input query. The second stage typically involves ranking the top-k content items. This stage may involve implemented a ranking function, which may be machine-learned, to the top-k content items to rank the content items from most relevant to least relevant. The final search results provided to a user device includes at least some of the ranked top-k content items.

The first stage—the top-k content item retrieval process—is typically the most time consuming task of the overall searching process. This may be particularly true for queries that are large (e.g., include 10 or more terms). Therefore, the bottleneck of obtaining search results is often generated by the first stage, as at the first stage, the search engine will need to analyze an immense volume of data. As queries become larger and larger, such as, for example, in the case with queries input using voice-based systems, the bottleneck can cause a diminished user experience as users may become frustrated with the latency in obtaining their search results. This frustration can cause users to become dissatisfied with their search engine, reducing the search engine's traffic, and thus impacting a search engine's business.

Thus, there is a need for methods and systems that reduce the latency associated with searches, and in particular decrease the amount of time with which is needed to perform top-k search result retrieval.

SUMMARY

The teachings disclosed herein relate to methods, systems, and programming for retrieving content items for a search. More particularly, the present teaching relates to methods, systems, and programming related to retrieving content items for a search in response to receiving a query including a plurality of terms.

In one example, a method, implemented on a computing device including a plurality of processors, memory, and a communication platform connector to a network for retrieving content items for a search is described. The method may include: receiving a query comprising a plurality of terms; obtaining, for each of the plurality of terms, a posting list of one or more content items, the posting list comprising a ranked list of term scores corresponding to the one or more content items, each of the term scores being indicative of a level of relevance of a corresponding content item to a term associated with the posting list; determining a list of relevant content items for the query based on the term scores in each posting list for the one or more content items identified with respect to each term; and providing at least one of the relevant content items as a response to the query.

In another example, a system comprising a plurality of processors, memory, and a communications platform in communication with a network for retrieving content items for a search is described. The system may comprise: a query decomposition unit configured to receive a query comprising a plurality of terms; a plurality of query term based searchers each being configured to: obtain a posting list of one or more content items for a term of the plurality of terms, the posting list comprising a ranked list of term scores corresponding to the one or more content items, each of the term scores being indicative of a level of relevance of a corresponding content item to a term associated with the posting list, and determine a list of relevant content items for the query based on the term scores in the posting list for the one or more content items identified with respect to the term; and a query search result aggregator configured to provide at least one of the relevant content items as a response to the query.

Other concepts relate to software for implementing the present teaching on retrieving content items for a search. A software product, in accord with this concept, includes at least one machine-readable non-transitory medium and information and/or instructions stored thereon. The instructions stored on the medium may include executable program code data, parameters in association with the executable program code, and/or information related to a user, a request, content, and/or information related to retrieving content items for a search.

In one example, a machine-readable, non-transitory and tangible medium having instructions recorded thereon for retrieving content items for a search is described. The instructions, when executed by one or more of a plurality of processors, may cause a computing device to: receive a query comprising a plurality of terms; obtain, for each of the plurality of terms, a posting list of one or more content items, the posting list comprising a ranked list of term scores corresponding to the one or more content items, each of the term scores being indicative of a level of relevance of a corresponding content item to a term associated with the posting list; determine a list of relevant content items for the query based on the term scores in each posting list for the one or more content items identified with respect to each term; and provide at least one of the relevant content items as a response to the query.

Additional novel features will be set forth in part in the description that follows, and in part will become apparent to those skilled in the art upon examination of the following and the accompanying drawings or may be learned by production or operation of the examples. The novel features of the present teachings may be realized and attained by practice or use of various aspects of the methodologies, instrumentalities and combinations set forth in the detailed examples discussed below.

BRIEF DESCRIPTION OF THE DRAWINGS

The methods, systems and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 2B is an illustrative flowchart of an exemplary process for outputting a response to a query, in accordance with various embodiments of the present teaching;

FIG. 5B is an illustrative flowchart of an exemplary process for storing term scores within a data structure, in accordance with various embodiments of the present teaching;

FIG. 9B is an illustrative flowchart of an exemplary process for performing a cleaning operation to a data structure, in accordance with various embodiments of the present teaching;

FIG. 10B is an illustrative diagram of an exemplary process for outputting a search result response, in accordance with various embodiments of the present teaching;

DETAILED DESCRIPTION

Figure 1A:
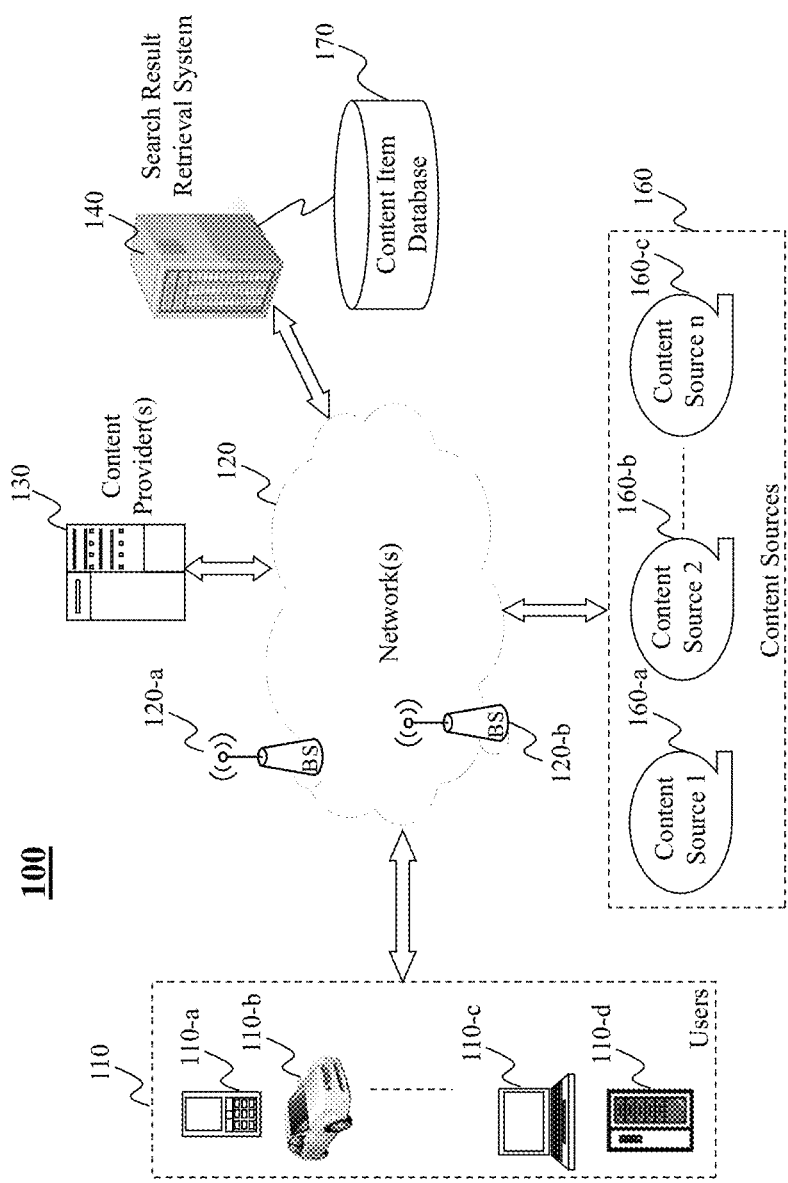
FIGS. 1A and 1B are illustrative diagrams of exemplary network environments for facilitating top-k search retrieval, in accordance with various embodiments of the present teaching.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The present teaching aims to eliminate the limitations of associated with previous searching systems, and obtain relevant search results in less time. More specifically, the present teaching aims to describe systems, methods, and programming that reduces the latency associated with a first searching stage, sometimes referred to as top-k retrieval. Furthermore, the systems, methods, and programming described herein generally relate to an improved technique for performing top-k retrieval harnessing multi-core processing capabilities.

A user may input a query into a search engine using their user device. Traditionally, a user may access a search engine via a web-browser operating on their user device. In such scenarios, the user may enter the query by the user inputting text into the search engine. This text may include one or more terms, which may be used by the search engine to understand what the user is requesting, and then retrieve content items related to the one or more terms. The search engine may then determine how relevant each content item is to the query, and may provide the most relevant content items to the user device as a search result (or search results). Longer queries may require more time to retrieve content items. For instance, voice searches (e.g., audio data representing an utterance including a query) may exceed ten terms. With such verbose queries, minimizing delays for providing a response including search results to the user is paramount.

Typically, search engines operate using a two-stage process: (1) a first stage commonly referred to as top-k retrieval, and (2) a second stage involving relevancy ranking. The first stage operates, in some embodiments, to obtain the top-k content items using a simple/coarse relevancy scoring mechanism. To do this, a large amount of data including various content items is analyzed, and based on the simple/coarse relevancy scoring mechanism, the top-k content items are identified and returned. The parameter "k" may correspond to any number, and may be predefined by the searching system and/or may be dynamically adjusted based on the user, the query, and the like. For example, "k" may be in the range of hundreds to thousands of content items. The second stage operates, in some embodiments, to re-rank the top-k content items using an advanced/fine relevancy scoring mechanism. For example, the second stage's relevancy scoring mechanism may correspond to a machine-learned function/algorithm. Generally speaking, the majority of the time consumed by the searching process is accounted for by the first stage. Therefore, to reduce the amount of time with which it takes to retrieve search results, and in particular, for verbose queries, the present description relates to techniques for reducing the first stage processing time.

In one embodiment, multiple posting lists may be analyzed in parallel by harnessing multi-core processing devices. One or more different processors may analyze each posting list in order to retrieve top-k candidates. A posting list, as described herein, may correspond to a list of content items that are ranked based on their relevancy to a particular term. In some embodiments, posting lists may be computed beforehand, and may be stored within memory. To reduce disk space, the posting list may be structured such that each entry in the posting list includes at least two attributes: a content item identifier unique to a particular content item within a corpus of content items that may be included within the search results, and a term score representing how relevant that content item is to the particular posting list's corresponding term. The various processors may analyze the posting lists sequentially, and the aggregate term scores for each content item may be computed (either completely or partially). The aggregate term scores may then be compared with a threshold value to determine whether a content item is to be included within the top-k content items.

Figure 1B:
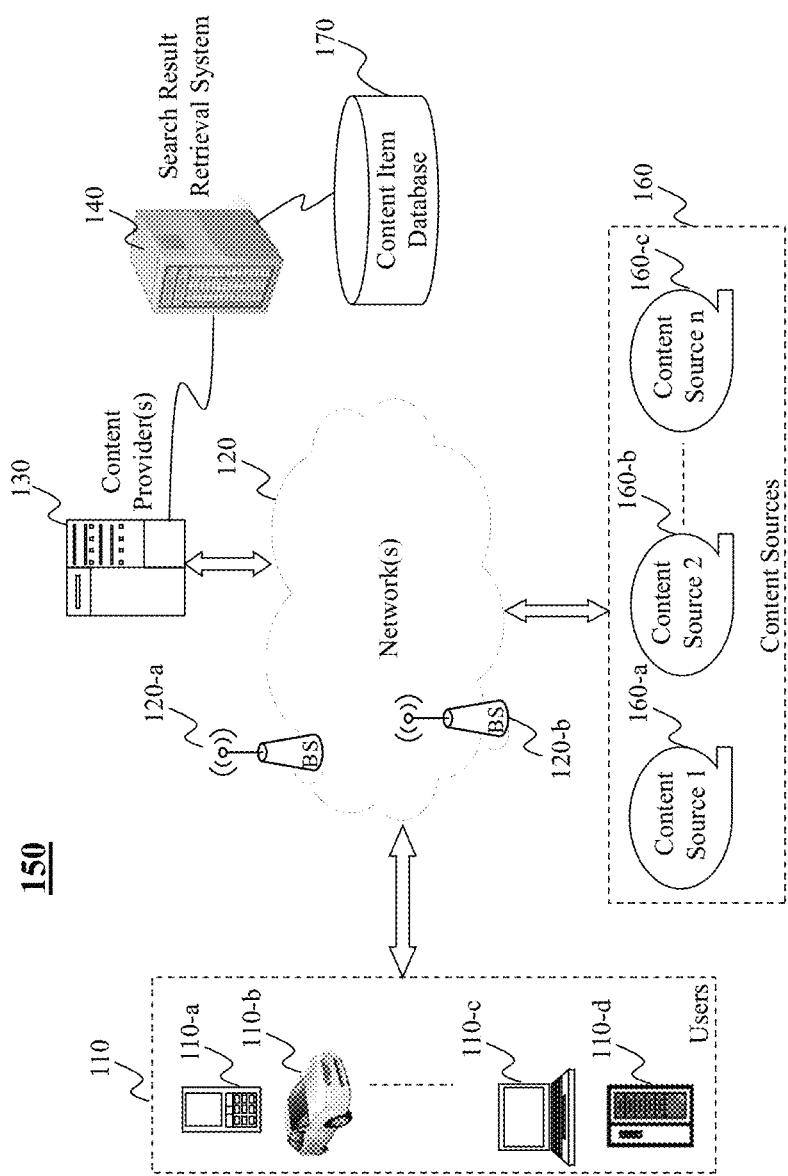

FIGS. 1A and 1B are illustrative diagrams of exemplary network environments for facilitating top-k search retrieval, in accordance with various embodiments of the present teaching. In FIG. 1A, an exemplary networked environment 100 is described. Exemplary networked environment 100 may include one or more user devices 110, such as user devices 110-a, 110-b, 110-c, and 110-d, one or more content sources 160, one or more content providers 130, a search result retrieval system 140, and a content item database 170, each of which may communicate with one another via one or more networks 120.

Network(s) 120, in some embodiments, may correspond to a single network or a combination of different networks. For example, network(s) 120 may be a local area network ("LAN"), a wide area network ("WAN"), a public network, a private network, a proprietary network, a Public Telephone Switched Network ("PSTN"), the Internet, an intranet, a wireless network, a virtual network, and/or any combination thereof. In one embodiment, network(s) 120 may also include various network access points. For example, environment 100 may include wired and/or wireless access points such as, and without limitation, base stations or Internet exchange points 120-a and 120-b. Base stations 120-a and 120-b may facilitate, for example, communications to/from user device(s) 110 and/or search result retrieval system 140 with one another as well as, or alternatively, one or more other components of environment 100 across network(s) 120.

User devices 110 may be of different types to facilitate one or more users operating user devices 110 to connect to network(s) 120. User devices 110 may correspond to any suitable type of electronic/computing device including, but not limited to, desktop computers 110-d, mobile devices 110-c (e.g., mobile phones, smart phones, personal display devices, personal digital assistants ("PDAs"), gaming consoles/devices, wearable devices (e.g., watches, pins/broaches, headphones, etc.), transportation devices 110-b (e.g., cars, trucks, motorcycles, boats, ships, trains, airplanes), mobile computers 110-c (e.g., laptops, ultrabooks), smart devices (e.g., televisions, set top boxes, smart televisions), smart household devices (e.g., refrigerators, microwaves, etc.), and/or smart accessories (e.g., light bulbs, light switches, electrical switches, etc.). A user, in one embodiment, may send data (e.g., a query) and/or receive data (e.g., a response) via user devices 110. For example, a user may speak, type, or otherwise input data representing a query (e.g., audio data representing an utterance including a query, text data representing a query, data representing a clickable search input, etc.) to their user device 110, which in turn may be communicated to search result retrieval system 140 across network(s) 120.

Content providers 160 may include one or more content providers 160-1, 160-2, and 160-3, in some embodiments. Although three content providers are shown within environment 100, any number of content providers may be included. Content providers 160 may correspond to any suitable content source, such as, and without limitation, an individual, a business, an organization, and the like. For example, content providers 160 may correspond to a government website, a news site, a social media website, and/or a content feed source (e.g., a blog). In some embodiments, content providers 160 may be vertical content sources. In one embodiment, each content source 160 may be configured to generate and send content to one or more of user devices 110 via network(s) 120. The content (e.g., a webpage) may include information consumable by a user via their user device 110.

In one embodiment, content sources 160 may populate content item database 170 with information regarding a relevancy of the document with respect to one or more terms and/or queries. For instance, search result retrieval system 140 may analyze content items from content sources 160 to determine how relevant each content item is to one or more searchable elements (e.g., a query, a term from a query, terms from a query, etc.). Search result retrieval system 140, in some embodiments, may generate various relational data structures including each content item's relevancy information, which may be stored within content item database 170. For example, content item database 170 may include a listing of content item identifiers, each corresponding to a content item from content sources 160, and a relevance score of that content item with respect to a particular query.

Search result retrieval system 140 may, in some embodiments, be configured to execute one or more processes to analyze a given query, and provide a response to that query including one or more search results. The one or more processes may include, extracting term scores from posting listings each associated with a particular term of a query, where each posting list may be analyzed using a separate processor of a computing device's plurality of processors (e.g., a multi-core processing device). Each term score may be stored in a data object associated with that term score's corresponding content item, and a lower bound term score and an upper bound term score may be computed. Based on the lower and upper term score bounds, a representation of the content item may be added to another data structure of candidate content items for responding to the query. Upon determining that a stopping condition, or conditions, have been satisfied, the processing of the posting lists may be stopped, and the candidate content items may be returned. Search result retrieval system 140 may then be configured to perform the second stage of search result processing, by which at least one of the candidate content items are selected for inclusion with a response including search results.

Content provider(s) 130 may correspond to one or more publishers that publish content and/or advertisements. For example, publishers 130 may be configured to present content obtained from one or more of content providers 160. In some embodiments, publishers 130 may present one or more advertisements thereon, which may be selected from an advertisement database, an advertisement source, and/or any other suitable source. In some embodiments, publishers 130 configured to provide product(s) and/or service(s), and may be configured to handle the advertising process for its own product(s) and/or a service (e.g., web sites, mobile applications, etc.) related to advertising, or a combination thereof. For example, publishers 130 may include such systems as an advertising agency or a dealer of advertisement that operates a platform that connects an advertiser or advertising agency one or more additional entities.

Networked environment 150 of FIG. 1B, in one illustrative embodiment, may be substantially similar to networked environment 100 of FIG. 1A, with the exception that search result retrieval system 140 may connect to content provider(s) 130 as a backend as opposed to via network(s) 120. Still, in other embodiments, content item database 170 may also connect to content sources 160 and/or content providers 130 as a backend, as opposed to via network(s) 120. Persons of ordinary skill in the art will recognize that user device 110 may store one or more features of search result retrieval system 140 and/or content item database 170 locally.

Figure 2A:
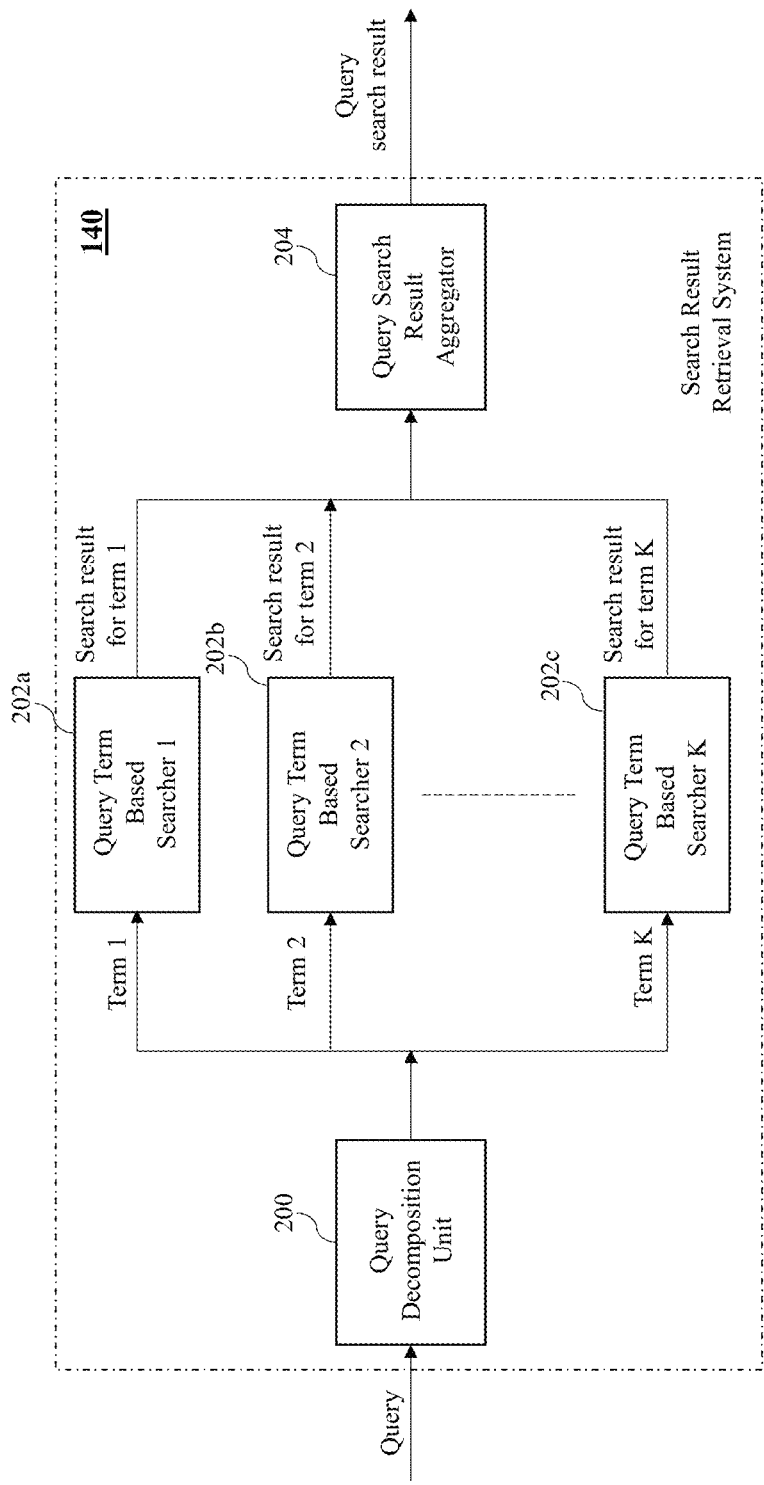
FIG. 2A is an illustrative diagram of an exemplary search result retrieval system, in accordance with various embodiments of the present teaching.

FIG. 2A is an illustrative diagram of an exemplary search result retrieval system, in accordance with various embodiments of the present teaching. In the illustrative embodiment, search result retrieval system 140 may include, amongst other components, a query decomposition unit 200, one or more query term based searchers, including a first query term based searcher 202a, a second query term based searcher 202b, and a k-th query term based searcher 202c, as well as a query search result aggregator 204. Search result retrieval system 140 may include a plurality of processors, memory, and a communications platform. In some embodiments, various computer programs including instructions executable by one or more of the plurality of processors may be stored in the memory, and may be executed in response to an input, such a receipt of a query from user device(s) 110 across network 120. Furthermore, search result retrieval system 140 may also be in communication with content item database 170, which may be accessed to obtain posting lists for various terms and/or data capable of being used by search result retrieval system 140 to generate the posting lists.

Query decomposition unit 200, in the non-limiting embodiment, may be configured to decompose a query received by search result retrieval system 140 into one or more terms. Query decomposition unit 200 may receive a query input from user device 110 via network(s) 120. Upon receipt, query decomposition unit 200 may parse the received data (e.g., text data) into its various constituent terms. For example, if the query is, "How far away is Jupiter?" query decomposition unit 200 may identify that this query includes at most five terms. Persons of ordinary skill in the art will recognize that some terms of a given query may not be "searchable," and so query decomposition unit 200 may be further operable to identify which terms are to be used for searching. For instance, query unit decomposition unit 200 may include natural language processing functionality that allows query decomposition unit 200 to obtain an understanding of the query, and output data representing the relevant search terms from the query.

As mentioned above, some queries may include certain terms that do not contribute to the search (i.e., terms that are not searched). Using the aforementioned example, the terms "How" and "is" may not be needed to be searched, whereas the term "Jupiter" may be a term that will be searched. Furthermore, some terms may be searched together, for example, the terms "far" and "Jupiter" and/or "away" and "Jupiter" may be searched together. Thus, as described herein, "term" may correspond to a single word and/or two or more words. Generally speaking, the longer the query, the more terms that may be identified by query decomposition unit 200, and thus the more searches that may occur.

Query term based searchers 202a-c, which collectively may referred to as query term based searcher(s) 202 herein, each may be configured to receive one term from query decomposition unit 200, analyze a posting list associated with that term, and then output search results for that term. In some embodiments, each of query term based searchers 202a-c may perform their respective tasks using at least one of a plurality of processors associated with search result retrieval system 140. For instance, search result retrieval system 140 may include multi-core processing functionalities. Each processor of search result retrieval system 140 may therefore be assigned to one of query term based searchers 202 to increase the parallel computing power.

Query term based searchers 202 may be configured to analyze a posting list associated with a particular term that has been received from query decomposition unit 200. In some embodiments, posting list identification information may be provided by query decomposition unit 200 so each query term based searcher 202 is capable of identifying the appropriate positing list within the memory of search result retrieval system 140 with which to analyze. However, in other embodiments, each query term based searcher 202 may, upon receipt of their respective term, identify the posting list associated with that term. Each query term based searcher 202 may analyze each entry of the posting list sequentially (e.g., non-random), and may identify a content item associated with that entry, as well as a term score for that content item. The term score may indicate how relevant a particular content item is with respect to a given term.

In some embodiments, a data structure stored within memory of search result retrieval system 140 may track the analysis of each query term based searcher 202. Thus, when one of query term based searchers 202 analyzes an entry, a determination is made by that query term based searcher 202 as to whether a data object representing the analyzed entry exists already in the data structure. If so, then the term score for that entry is added to that data object. If not, then a new data object associated with the content item that was analyzed may be generated and added to the data structure with the term score added to the new data object. At most, each content item will be represented within a posting list one time, therefore the contribution of that content item's term score from the analyzed posting list to an overall score for the content item—indicating how relevant the content item is to the query—may be stored in a vector of term scores, where each value within the vector is uniquely associated with one posting list.

Query term based searchers 202 may be further configured to compute a lower bound for each content item that is analyzed based on the data object for a corresponding content item. Based on the lower bound, the content item may be added to a listing of candidate content items that may be deemed relevant to the query, and thus capable of being used for responding to the query. If the lower bound is greater than or equal to a threshold value, then that content item may be added to the listing of candidate content items. The threshold Θ may correspond to the score of the k-th content item in the listing of candidate content items, where k is a predefined parameter representative of the size of the listing.

Each query term based searcher 202 may output their respective search results for that term, which are stored within the data structure, and then provided to query search result aggregator 204. For example, query term based searcher 202a may output search results for term 1, query term based searcher 202b may output search results for term 2, and query term based search 202c may output search results for term K. Upon determining that a stopping condition has been satisfied, each query term based searcher 202 may stop analyzing their respective posting list, and the final listing of candidate content items may be set based on the predefined parameter k. Query search result aggregator 204 may then be configured to perform the second stage of searching where search result re-ranking occurs. For example, using one or more sophisticated algorithms, the listing of candidate content items may be re-ranked so that the most relevant content item is listed first, followed by the next most relevant content item, and so on. The re-ranked candidate content items, which may also be referred to as query search results, may then be output to user device 110 as a response to the query.

As mentioned above, search result retrieval system 140 may include a plurality of processors, memory, and a communications platform capable of connecting to network(s) 120. The plurality of processors may include any suitable processing circuitry capable of controlling operations and functionality of one or more components/modules of search result retrieval system 140. The processors may also facilitate communications between various components within query decomposition unit 200, query term based searchers 202, and query search result aggregator 204, as well as, or alternatively, with one or more other systems/components of search result retrieval system 140. In some embodiments, each processor may include a central processing unit ("CPU"), a graphic processing unit ("GPU"), one or more microprocessors, a digital signal processor, or any other type of processor, or any combination thereof. In some embodiments, the functionality of the processor may be performed by one or more hardware logic components including, but not limited to, field-programmable gate arrays ("FPGA"), application specific integrated circuits ("ASICs"), application-specific standard products ("ASSPs"), system-on-chip systems ("SOCs"), and/or complex programmable logic devices ("CPLDs"). Furthermore, each processor may include its own local memory, which may store program systems, program data, and/or one or more operating systems. However, the processors may run an operating system ("OS") for one or more components of search result retrieval system 140, and/or one or more firmware applications, media applications, and/or applications resident thereon. In some embodiments, the processors may run a local client script for reading and rendering content received from one or more websites or external content sources. For example, the processors may run a local JavaScript client for rendering HTML or XHTML content.

The memory of search result retrieval system 140 may include one or more types of storage mediums such as any volatile or non-volatile memory, or any removable or non-removable memory implemented in any suitable manner to store data for search result retrieval system 140. For example, information may be stored using computer-readable instructions, data structures, and/or program systems. Various types of storage/memory may include, but are not limited to, hard drives, solid state drives, flash memory, permanent memory (e.g., ROM), electronically erasable programmable read-only memory ("EEPROM"), CD-ROM, digital versatile disk ("DVD") or other optical storage medium, magnetic cassettes, magnetic tape, magnetic disk storage or other magnetic storage devices, RAID storage systems, or any other storage type, or any combination thereof. Furthermore, the memory may be implemented as computer-readable storage media ("CRSM"), which may be any available physical media accessible by the processors to execute one or more instructions stored within the memory. In some embodiments, one or more applications may be stored within the memory. The processors may be configured to execute one or more instructions associated with those applications, where the one or more instructions are operable to be stored within the memory (either persistently or temporarily).

The communications platform may include any communications platform and/or circuitry allowing or enabling one or more components of search result retrieval system 140 to communicate with one another, and/or with one or more additional devices, servers, databases (e.g., content item database 170), and/or systems. For example, the communications platform may facilitate communications between two or more components of search result retrieval system 140. In some embodiments, communications between one or more components of search result retrieval system 140 may be communicated using user device(s) 110 across network(s) 120 via the communications platform. For example, network(s) 120 may be accessed using Transfer Control Protocol and Internet Protocol ("TCP/IP") (e.g., any of the protocols used in each of the TCP/IP layers), Hypertext Transfer Protocol ("HTTP"), WebRTC, SIP, and/or wireless application protocol ("WAP"). Various additional communication protocols may be used to facilitate communications between various components of search result retrieval system 140 and/or to/from search result retrieval system 140, including, but not limited to, Wi-Fi (e.g., 802.11 protocol), Bluetooth, radio frequency systems (e.g., 900 MHz, 1.4 GHz, and 5.6 GHz communication systems), cellular networks (e.g., GSM, AMPS, GPRS, CDMA, EV-DO, EDGE, 3GSM, DECT, IS 136/TDMA, iDen, LTE or any other suitable cellular network protocol), infrared, BitTorrent, FTP, RTP, RTSP, SSH, and/or VOIP.

The communications platform may use any communications protocol, such as any of the previously mentioned exemplary communications protocols. In some embodiments, one or more components of search result retrieval system 140 may include one or more antennas to facilitate wireless communications with a network using various wireless technologies (e.g., Wi-Fi, Bluetooth, radiofrequency, etc.). In yet another embodiment, one or more components of search result retrieval system 140 may include one or more universal serial bus ("USB") ports, one or more Ethernet or broadband ports, and/or any other type of hardwire access port so that the communications platform facilitates communications with one or more communications networks (e.g., network(s) 120).

FIG. 2B is an illustrative flowchart of an exemplary process for outputting a response to a query, in accordance with various embodiments of the present teaching. In a non-limiting embodiment, process 250 may begin at step 252. At step 252, a query may be received. For example, a query including a plurality of terms may be received by search result retrieval system 140 from user device 110 via network(s) 120. At step 254, the query may be decomposed into a plurality of terms. Upon receipt of the query, search result retrieval system 140 may provide the query to query decomposition unit 200. Query decomposition unit 200 may parse the query, identify the various terms—if more than one—include within the query, and may output data representative of the one or more terms included within the query. In some embodiments, an additional determination of a posting list associated with each of the one or more terms may occur. In this particular scenario, information indicating which posting list is to be used by query term based searchers 202 may also be generated.

At step 256, a posting list associated with each term may be searched. For instance, each of query term based searcher 202 may receive a term to be searched. Query term based searcher 202 may also receive the information indicting the posting list to be searched, in one embodiment, from query decomposition unit 200. However alternatively, each query term based searcher 202 may generate the posting list information itself. Each query term based searcher 202 may search the posting lists sequentially. In some embodiments, at least one processor of the plurality of processors associated with search result retrieval system 140 may be assigned to each of query term based searcher 202, which may be employed to execute the task of searching/analyzing the posting lists.

At step 258, one or more relevant content items may be identified for each term. The one or more content items may be identified based on the term scores for each content item, which may be extracted from the posting lists. In some embodiments, the term scores may be added to a data object representing a corresponding content item, from each posting list, within a data structure. The top-k content items whose lower bound term scores exceed a threshold term score value Θ may then be added to a listing of candidate content items. Each query term based searcher 202 may analyze their respective posting list, and add term scores to corresponding data objects within the data structure, until a stopping condition, or conditions, is/are satisfied.

At step 260, one or more content items relevant to the query may be determined. For instance, query search result aggregator 204 may receive the search results for each term, which may correspond to the listing of candidate content items, and may perform a re-ranking of the content items using one or more ranking algorithms. These content items may correspond to the top-k content items. Then, at step 262, a response including at least some of the top-k content items, ranked, may be output by search result retrieval system 140 to user device 110.

Figure 3A:
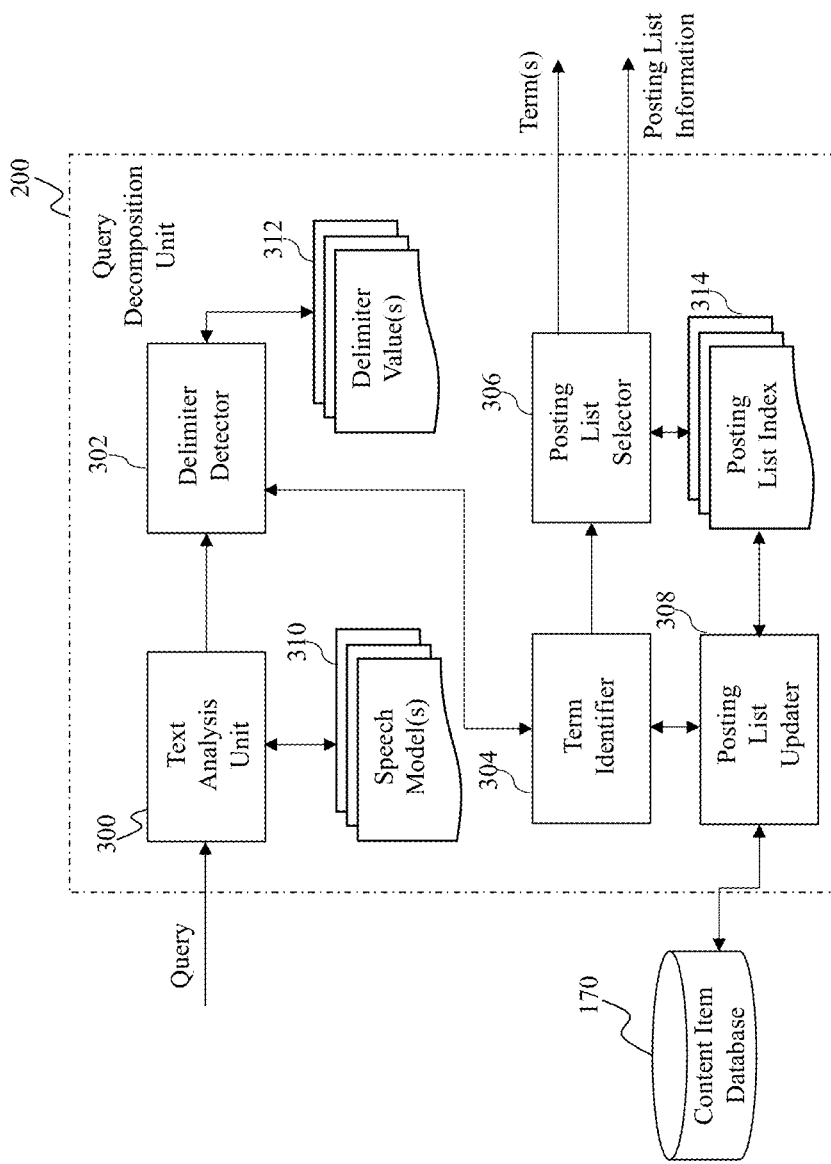
FIG. 3A is an illustrative diagram of an exemplary query decomposition unit, in accordance with various embodiments of the present teaching.

FIG. 3A is an illustrative diagram of an exemplary query decomposition unit, in accordance with various embodiments of the present teaching. Query decomposition unit 200, in the illustrative embodiment, may include a text analysis unit 300, a delimiter detector 302, a term identifier 304, a posting list selector 306, and a posting list updater 308. In some embodiments, each of text analysis unit 300, delimiter detector 302, term identifier 304, posting list selector 306, and posting list updater 308 may each be implemented via one or more computer programs stored within the memory of search result retrieval system 140. For instance, one or more processors of the plurality of processors associated with search result retrieval system 140 may be configured to execute one or more instructions (e.g., computer program(s)) to cause the functionalities associated with one or more of text analysis unit 300, delimiter detector 302, term identifier 304, posting list selector 306, and posting list updater 308 to be performed.

Text analysis unit 300 may, in one embodiment, be configured to receive a query. For instance, a user may submit a query via their user device 110, which may be sent to search result retrieval system 140 across network(s) 120. The query may be in the form of text data and/or audio data; however, image data and/or other forms of query inputs may similarly be employed. For example, a user may speak an utterance including a query into their user device 110, and audio data representing the utterance may be sent to search result retrieval system 140. In this particular scenario, search result retrieval system 140 may include automatic speech recognition functionality capable of generating text data representing the audio data. However, for simplicity and without limitation, text data representing the query may generally be thought of as being received by search result retrieval system 140, and in particular, text analysis unit 300.

Upon receipt of the query, text analysis unit 300 may analyze the text data to identify the various words, numbers, characters, etc., that are included therein. Text analysis unit 300 may employ one or more speech models 310 to review the query text and identify each word that may exist within the query. For example, text analysis unit 300 may identify that the query, "How far away is the moon?" includes the words: "How," "far," "away," "is," "the," and "moon." In some embodiments, text analysis unit 300 may perform an n-best matching analysis to determine the n-best words/speech elements that are represented within the query. Each speech element (e.g., word) may include n results, each including a confidence score representing how likely it is that that word is the identified word. The n-best results may be ranked based on the confidence score, and the top results may then be output to delimiter detector 302.

Delimiter detector 302 may be configured, in one embodiment, to determine whether the received query includes any delimiters. Delimiter values 312 may be used by delimiter detector 302 to identify the presence of any delimiters within the query's text. For example, such delimiters may include, but are not limited to, commas, semi-colons, periods, parentheses, and the like. The presence of one or more delimiters may be used, in conjunction with the received terms, to determine a meaning of the query. In particular, the words identified by text analysis unit 300 and the delimiter information detected by delimiter detector 302 may be provided to term identifier 304 to identify one or more terms within the query.

Term identifier 304, in one embodiment, may be configured to identify one or more terms included within a query. As described herein, a "term" corresponds to a text object that is searched, or capable of being searched, to retrieve search results for responding to an input query. For instance, not all words included within a query require a search to be performed. For example, the article "a" before a word within a query may not require a separate query term based searcher 202 to perform a search. As another example, using the previously mentioned query, "How far away is the moon?" the words "how" and "is" may not require searches to be performed, but instead are identified by term identifier 304 as contributing to the meaning of the query. These types of words may therefore be flagged by term identifier 304 as being non-search terms, which may aid in reserving processing resources to terms that will be more usable to searching. In some embodiments, a "term" may correspond to more than one word. For example, the query, "Pictures of red apples," may include two words—"red" and "apple"—that may form a "term" to be used for searching. Generally speaking, term identifier 304 may employ any suitable term identification process to identify one or more terms present within a given query, and output those terms to posting list selector 306.

Posting list selector 306 may, in one embodiment, be configured to receive the one or more terms identified by term identifier 304 for a given query, and select, or otherwise identify, a particular posting list associated with those terms. In some embodiments, posting list selector 306 may access a posting list index 314, which may be stored in the memory of search result retrieval system 140, to determine which posting list corresponds to which term. In some embodiments, posting lists may be generated beforehand and stored within content item database 170. Content item database 170 may then output posting list information that are stored within posting list index 314.

Each posting list may be associated with a particular term. For example, the term "basketball" may have a posting list associated therewith, where this posting list includes a listing of content items that have been identified as being related to the term "basketball." The posting lists may further be inverted rankings, where the "top" ranked content item is ranked first, and each subsequent content item has a lower or equal ranking. In this way, the first entry in a posting list may represent the content item that is most relevant to a particular term. Furthermore, to save storage space, the posting list may include identifiers representing a corresponding content item, and a term score associated with that content item. For example, a first entry in a posting list may include a first content item identifier, representative of a first content item related to a given posting list's term, and a first term score, representing how relevant the first content item is to the term. The next entry in the posting list may correspond to a second content item identifier associated with a second content item, and include a second term score representing how relevant the second content item is to the term. In the illustrative embodiment, the second term score is less than or equal to the first term score. Furthermore, each posting list may only include one instance of any one particular content item. Thus, if the first content item is identified as the first entry, then nowhere else in the posting list will there be another entry associated with the first content item.

Posting list selector 306 may identify a posting list as being associated with a given score by performing a comparison between the given term and each of the available posting list terms stored within posting list index 314. The posting list having the highest/greatest score may then be selected as the posting list to be searched for that term. Upon identifying the posting list for a particular term, posting list selector 306 may generate and output posting list information along with the given term(s). The posting list information may include an addressable pointer to the corresponding posting list stored within the memory of search result retrieval system 140. In some embodiments, the pointer may address the location of the posting list within content item database 170. In this scenario, the posting list may be provided to search result retrieval system 140, at which point it may be stored in local memory.

In some embodiments, each posting list may be segmented into two or more segments. Each segment may have a certain number of entries, which may be specified beforehand and/or may be configurable. If the posting lists are segments, in one embodiment, then each processor(s), when analyzing a posting list, may analyze a segment of the posting list individually. After analysis of one segment is complete, the processor(s) may retrieve another segment, which may be analyzed, and the process repeated as needed.

In some embodiments, term identifier 304 may be further configured to identify terms that do not have a corresponding posting list already generated therefore. In this scenario, term identifier 304 may generate an instruction and send that instruction to posting list updater 308. The instruction may cause posting list updater 308 to generate a posting list for that newly identified term, or otherwise cause a posting list to be generated for the newly identified term. For instance, posting list updater 308 may access content item database 170 and identify all content items stored therein that are related to the newly identified term. Posting list updater 308 may then generate term scores for each content item in relation to the newly identified term, and then may rank the posting list based on those term scores. Posting list updater 308 may then update posting index 314 to include the newly generated posting list for the newly identified term.

Figure 3B:
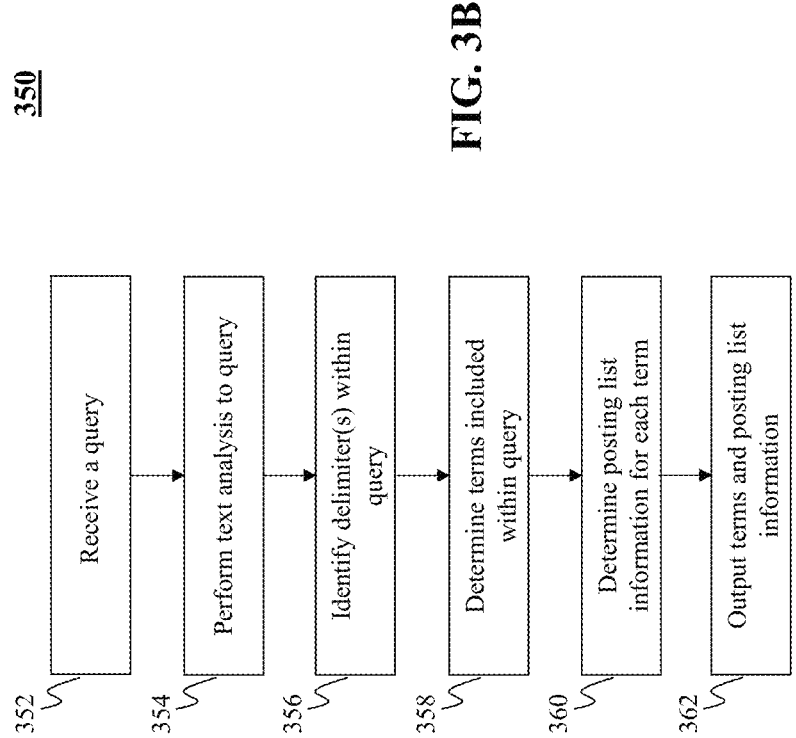
FIG. 3B is an illustrative flowchart of an exemplary process for determining posting list information for one or more terms of a query, in accordance with various embodiments of the present teaching.

FIG. 3B is an illustrative flowchart of an exemplary process for determining posting list information for one or more terms of a query, in accordance with various embodiments of the present teaching. Process 350 may, in a non-limiting embodiment, begin at step 352. At step 352, a query may be received. Text analysis unit 300 may receive the query, for instance. At step 354, text analysis may be performed to the query. For example, text analysis unit 300 may employ speech model(s) 310 to identify the various grammatical object present within the query. At step 356, one or more delimiters, if present, may be identified within the query. For instance, delimiter detector 302 may use delimiter value(s) 312 to identify the presence of, or absence of, delimiters within the received query. At step 358, terms included within the query may be determined. For instance, using the text analysis information from text analysis unit 300 and the delimiter information from delimiter detector 302, term identifier 304 may determine one or more terms included within the query. At step 360, posting list information for each term may be determined. For example, posting list selector 306 may select a posting list associated with a given term. Posting list selector 306 may select a posting list based on posting list index 314, which may store a listing of the various posting lists available, the term that those posting lists are associated with, and a memory address location of where that posting list is located (e.g., within memory of search result retrieval system 140 and/or content item database 170). Posting list selector 306 may then generate posting list information for each term indicating the corresponding posting list selected for a given term and the location of that posting list. At step 362, the various terms of the query and corresponding post list information for those terms may be output.

Figure 4:
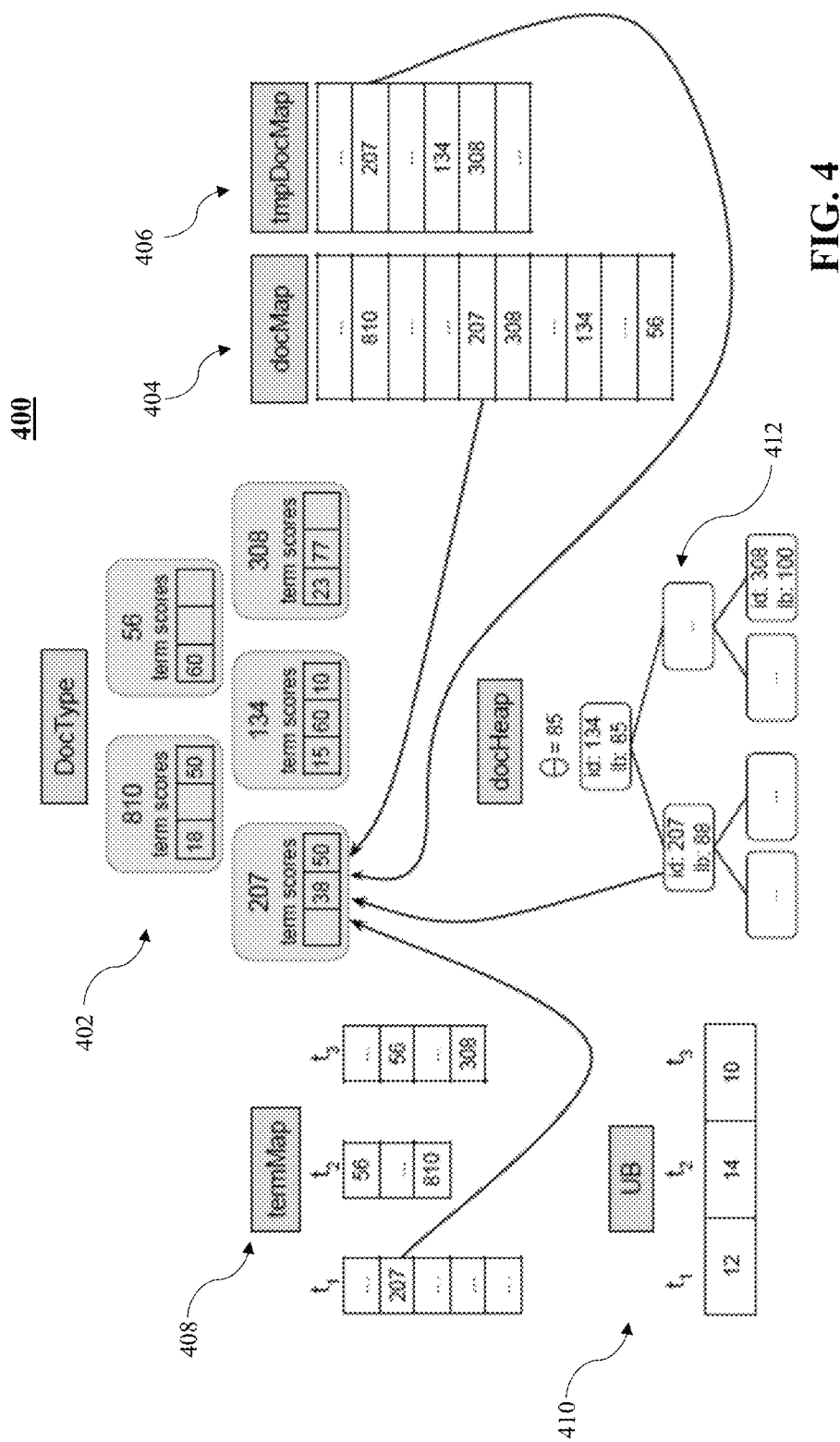
FIG. 4 is an illustrative diagram of an exemplary data structure capable of being used for search result retrieval, in accordance with various embodiments of the present teaching.

FIG. 4 is an illustrative diagram of an exemplary data structure capable of being used for search result retrieval, in accordance with various embodiments of the present teaching. In the illustrative embodiment, a data structure 400 is shown, which may include various additional data structures. For example, and without limitation, data structure 400 may be formed of a first data structure 402 (e.g., "DocType" data structure), a second data structure 404 (e.g., "docMap" data structure), a third data structure 406 (e.g., "tmpDocMap" data structure), a fourth data structure 408 (e.g., "termMap" data structure), a fifth data structure 410 (e.g., "UB" data structure), and a sixth data structure 412 (e.g., "docHeap" data structure). Each of data structures 402-412 work together synchronously to form and maintain data structure 400, and produce the top-k search results for an input query.

As each posting list is scanned, a determination may be made as to whether a corresponding content item identifier (e.g., an identifier representing a particular content item within content item database 170) has already been analyzed. This determination may be performed by looking at second data structure 404, the docMap data structure. The docMap data structure, in one embodiment, corresponds to a global data structure shared amongst all of the posting lists being analyzed. When an entry of a posting list is analyzed, the content item identifier associated with that entry may be determined, and that content item identifier may compared against the content item identifiers stored within second data structure 404. If second data structure 404 includes that content item identifier, then second data structure 404 may return a corresponding data object from first data structure 402 associated with that content item identifier. For example, as a posting list for a first term score is scanned, a content item identifier "207" may be encountered within that posting list. Second data structure 404, as seen within FIG. 4, may include content item identifier 207, indicating that a data object within first data structure 402 already exists. Therefore, in this particular example, the data object for content item identifier 207 may be returned, and the newly encountered term score for content item identifier 207 within the first posting list may be added to the data object for the first term. Alternatively, if second data structure 404 does not include the content item identifier encountered within a posting list, then a new data object may be generated within first data structure 402 for that content item identifier. The encountered term score for the first term may then be added to the newly generated data object, and the content item identifier may be added to second data structure 404.

As seen within FIG. 4, each data object within first data structure 402 includes a content item identifier representing a content item with which that data object refers to. Furthermore, each data object includes a vector of term scores, with each attribute of the vector being associated with a term score from one of the posting lists for a particular term score. In the illustrative embodiment, the given query includes three terms, and therefore the vector includes three attributes fillable by a term score. In this scenario, three posting lists may be analyzed, each posting list being associated with one of the three terms. The vector's first position may be filled by a term score associated with a content item if present within the first posting list, the vector's second position may be filled by a term associated with the content item if present within the second posting list, and the vector's third position may be filled by a term associated with the content item if present within the third posting list. Each posting list can include at most one entry of a particular content item, and therefore if a particular content item identifier is encountered within a posting list, the term score associated with that entry may be safely added to the vector at the particular term's vector position, as no other term score can be added to that vector for that content item within that posting list.

Fourth data structure 408 may include information regarding which content item identifiers, and thus content item, have been analyzed in each posting list. As mentioned above, each posting list may be analyzed separately by one (or more) processor(s) of a plurality of processors associated with search result retrieval system 140. Further, the one (or more) processor(s) analyzing one posting list will differ from the one (or more) processor(s) analyzing any of the other posting lists. In one embodiment, fourth data structure 408 (e.g., the "termMap" data structure) may correspond to a local map replica of second data structure 404 (e.g., "docMap" data structure). The one (or more) processor(s) associated with the analysis of a given posting list may generate their respective portion of fourth data structure 408.

In some embodiments, the one (or more) processor(s) operating and analyzing each posting list may generate their respective portions of fourth data structure 408 in response to determining that a threshold condition associated with second data structure 404 has occurred. For instance, in response to determining that second data structure 404 has a size (e.g., number of entries) that is less than a threshold number, $\Phi$, the one (or more) processor(s) may generate fourth data structure 408. As an illustrative example, $\Phi=10,000$ entries.

In some embodiments, second data structure 404 may be scanned by a processing function, and may cause copies of content item identifiers to be included within fourth data structure 408. This process may occur if the corresponding data object from first data structure 402, as identified while scanning over second data structure 404, does not include a term score for a particular posting list. This may allow each processor analyzing each posting list to track which terms the other posting lists have encountered already, for example.

Fifth data structure 410 may, in one embodiment, include data representative of a current upper bound term score for each posting list. At each processing stage of each posting list, fifth data structure 410 may store that posting list's current term score (e.g., the term score analyzed by the processor(s) operating on that posting list). This term score indicates that any other content item identifier's encountered within that posting list will, at a maximum, have the current term score as their score.

In some embodiments, when the sum of the upper bound term scores in the array of fifth data structure 410 is less than a threshold value, $\Theta$, then search result retrieval system 140 may identify that no new data objects capable of being added to first data structure 402 may contribute. In other words, even if a new content item identifier is encountered that does not yet have a data object stored within first data structure 402, a new data object for that content item need not be generated. This is because that content item's corresponding term score cannot contribute to the top-k results. Additionally, when the upper bound term scores are less than the threshold value, $\Theta$, a cleaning processing—associated with third data structure 406—may begin executing.

In some embodiments, the cleaning process may begin in response to determining that the number of entries within second data structure 404 is less than a threshold number, $\Phi$. After determining that this condition has been satisfied, third data structure 406 (e.g., "tempDocMap" data structure) may be generated. Third data structure 406 may include content item identifiers from second data structure 404 that have a term score lower bound greater than threshold value $\Theta$. After all content item identifiers that have a term score lower bound greater than threshold value $\Theta$ are copied to third data structure 406, a compare and swap ("CAS") operation may be performed, flipping the references from third data structure 406 to second data structure 404, such that second data structure 404 now only includes content item identifiers with lower bounds greater than $\Theta$.

Sixth data structure 412 (e.g., "docHeap" data structure), in the illustrative embodiment, may store the top-k candidate search results thus far. The final list of relevant content items, corresponding to the top-k results, may correspond to the content items referenced by the data objects stored within sixth data structure 412 upon a stopping condition being satisfied. The stopping condition, for instance, may correspond to when second data structure 404 has a same size (e.g., number of entries) as sixth data structure 412. This indicates that the two data structures include an identical number of entries.

In some embodiments, any content item whose lower bound term score is greater than a threshold value, $\Theta$, may be added to sixth data structure 412. Threshold value $\Theta$ may initially be set at zero (e.g., $\Theta=0$), and may be updated upon a new content item's lower bound term score being added to sixth data structure 412. As seen within FIG. 4, each data object within sixth data structure 412 includes a content item identifier representing the content item with which is being referenced thereby, and a lower bound term score for that content item as determined based on the posting list traversal thus far. Sixth data structure 412 may be formed such that the content item having a lowest/smallest lower bound term score is a top node, while all nodes descending therefrom have lower bound term scores that are lower/smaller.

Figure 5A:
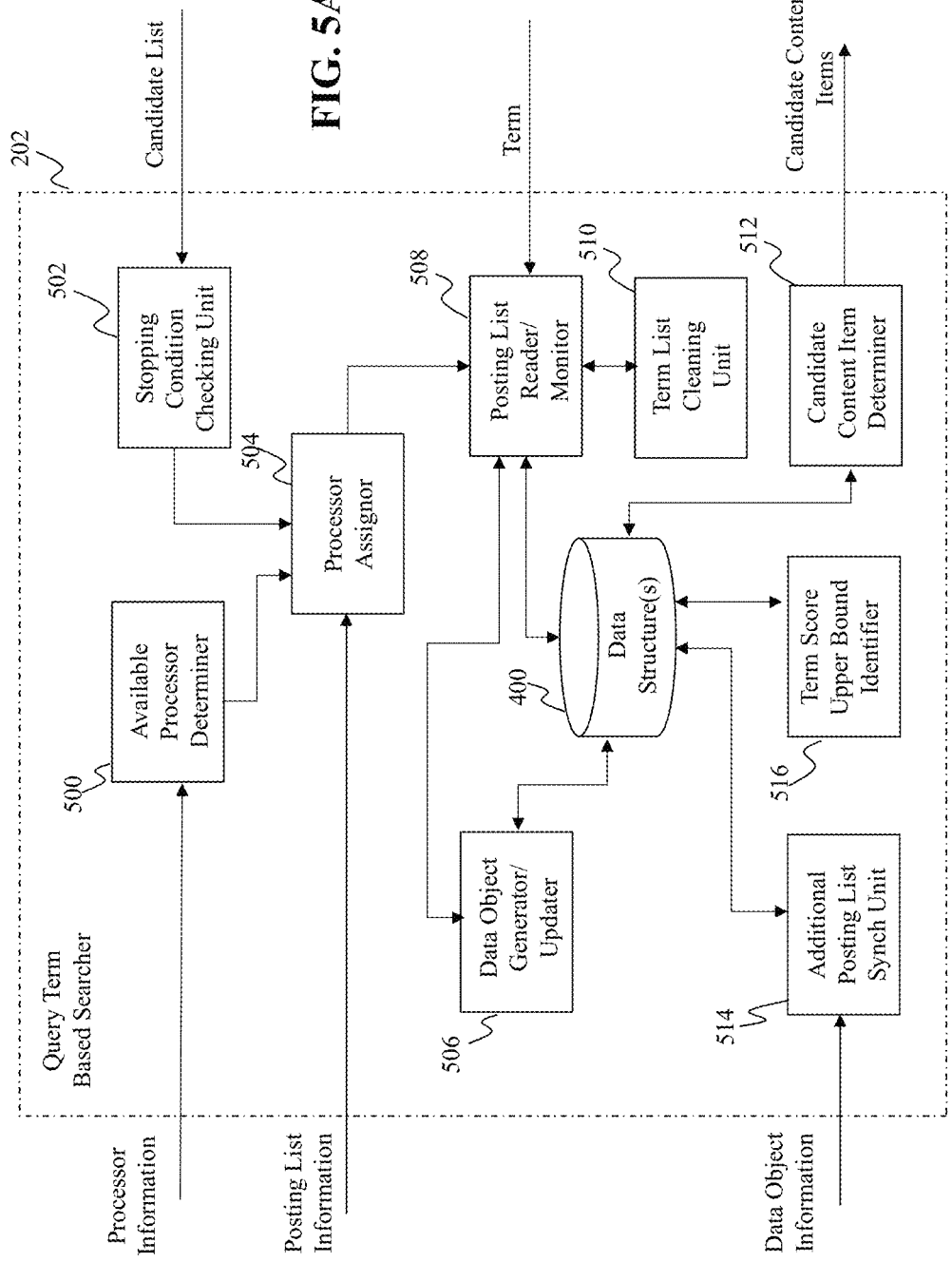
FIG. 5A is an illustrative diagram of an exemplary query term based searcher, in accordance with various embodiments of the present teaching.

FIG. 5A is an illustrative diagram of an exemplary query term based searcher, in accordance with various embodiments of the present teaching. In the illustrative embodiment, query term based searcher 202 may include an available processor determiner 500, a stopping condition checking unit 502, a processor assignor 504, a data object generator/updater 506, a posting list reader/monitor 508, a term list cleaning unit 510, a candidate content item determiner 512, an additional posting list synchronization unit 512, and a term score upper bound identifier 516. In some embodiments, each of available processor determiner 500, stopping condition checking unit 502, processor assignor 504, data object generator/updater 506, posting list reader/monitor 508, term list cleaning unit 510, candidate content item determiner 512, additional posting list synchronization unit 512, and term score upper bound identifier 516 may each be implemented via one or more computer programs stored within the memory of search result retrieval system 140. For instance, one or more processors of the plurality of processors associated with search result retrieval system 140 may be configured to execute one or more instructions (e.g., computer program(s)) to cause the functionalities associated with one or more of available processor determiner 500, stopping condition checking unit 502, processor assignor 504, data object generator/updater 506, posting list reader/monitor 508, term list cleaning unit 510, candidate content item determiner 512, additional posting list synchronization unit 512, and term score upper bound identifier 516 to be performed. Additionally, query term based searcher 202 may include data structure 400 (e.g., including data structures 402-412), which may additionally be stored within the memory of search result retrieval system 140.

Available processor determiner 500, in one embodiment, may be configured to determine an amount of available processors for executing tasks. As mentioned above, search result retrieval system 140 may include a plurality of processors, corresponding to the multi-core processing structure of the exemplary search result retrieval system 140. Available processor determiner 500 may obtain processor information by analysis of the current functions/tasks being performed by search result retrieval system 140. The processor information may indicate a total number of processors that could be allocated to a task for query term based searcher 202, as well as a number of currently available (e.g., not in use) processors. Available processor determiner 500 may output available processor information, which may be provided to processor assigner 504.

Processor assignor 504, in one embodiment, may be configured to assign one or more of the available processors to a particular task associated with a given query term based searcher 202 (e.g., one of query term based searchers 202a-c). Processor assignor 504 may receive posting list information from query decomposition unit 200, indicating the posting list to be analyzed by that particular query term based searcher 202. Based on the available processor information received from available processor determiner 500 and the posting list information, processor assignor 504 may assign at least one of the available processors to perform a given task (e.g., analysis of a posting list) for query term based searcher 202. After assigning the at least one processor, processer assignor 504 may provide the posting list information and the assigned processor(s) information to posting list reader/monitor 508.

Posting list reader/monitor 508 may, in some embodiments, be configured to analyze a posting list—using the assigned processor(s)—to determine a content item identifier, representative of a content item from content item database 170, associated with an entry of the posting list, and that content item's term score for a given term. Posting list reader/monitor 508 may receive a term output from query decomposition unit 200 that has been assigned to a particular query term based searcher 202. That query term based searcher 202 may analyze a corresponding posting list associated with the term to identify content items relevant to that term. Furthermore, as there may be multiple instances of query term based searcher 202, each associated with a different term and thus a different posting list, the various analysis of those different posting lists may be performed in parallel by the assigned processor(s).

As the assigned processor reads each posting list, posting list reader/monitor 508 may determine a content item identifier associated with a current entry of the posting list, and may extract a term score associated with that entry. For example, if a first entry in a first posting list associated with a first term of a query corresponds to a content item having an identifier 207, then the term score associated with the content item for the first term may be extracted from the first posting list. The content item identifier associated with each posting list entry may then be added to second data structure 404 to indicate that the corresponding content item has been analyzed from one of the posting lists. Furthermore, the current entry's content item identifier may be provided to data object generator/updater 506.

Data object generator/updater 506 may determine whether a new data object is needed for first data structure 402 of data structure(s) 400, or if an update is needed for an existing data object within first data structure 402. Posting list reader/monitor 508 may determine whether the posting list entry already is represented within first data structure 402. If so, then no new data object is needed to be generated, and the term score for that content item for that term may be added to the vector of the already existing data object associated with the content item identifier. For example, looking at FIG. 4, if during the reading of a posting list for the second term, $t_2$, an entry for content item identifier 810 is encountered, then data object generator/updater 506 may determine that a data object for this content item identifier already exists within first data structure 402. Therefore, the term score for second term $t_2$, extracted from the posting list analyzed by posting list reader/monitor 508 may be added to a position within a term score vector for the data object associated with content item identifier 810, thereby updating the overall term score for this content item. However, if during the reading of a posting list for the second term, $t_2$, another entry for content item identifier 31 is encountered, then data object generator/updater 506 may determine that a data object for this content item identifier does not yet exist within first data structure 402. Therefore, in this particular scenario, data object generator/updater 506 may generate a new data object for this content item identifier (e.g., content item identifier 31), which may have the extracted term score for the corresponding term added to that data object's term score vector at a position associated with the particular term the posting list is associated with.

As each posting list is read by posting list reader/monitor 508, second data structure 404 may be updated. Furthermore, data object information may be received by data structure 400 from the other parallel versions of query term based searcher 202 to account for updates therefrom. For instance, data object information from the other query term based searcher(s) 202 being executed in parallel may be received by additional posting list synch unit 514. Additional posting list synch unit 514 may be configured to add the additional posting list information (e.g., data object updates, posting list traversal information, upper bound score information) to one or more of the data structures included within data structure 400. For instance, fourth data structure 408 may be updated based on the current posting list traversal information (e.g., the content item identifiers analyzed thus far by for posting list) from the other parallel processes being executed by the additional query term based searcher(s) 202.

Additionally, fifth data structure 410 may be updated based on the current term score upper bound for each posting list being analyzed. Term score upper bound identifier 516, in one embodiment, may perform the updates to the term score upper bounds. For instance, term score upper bound identifier 516 may determine a current posting list entry's term score, and may set that term score as being the upper bound term score for a given term. The upper bound term score corresponds to a maximum possible term score for any content item that has not yet been encountered by posting list reader/monitor 508 for a given posting list. Therefore, term score upper bound identifier 516 may be configured to update or not update an upper bound term score based on the term score of the posting list entry currently under analysis by each of query term based searchers 202.

Candidate content item determiner 512 may, in some embodiments, be configured to determine the candidate content items capable of being included as the top-k search results. For instance, based on objects included within sixth data structure 412, candidate content item determiner 512 may output candidate content items that may be analyzer by query result aggregator 204. In some embodiments, candidate content item determiner 512 may output the candidate content items in response to stopping condition checking unit 502 receiving a stopping condition instruction.

Stopping condition checking unit 502, in one embodiment, may receive a stopping condition instruction from one of query term based searchers 202 corresponding processor(s). In some embodiments, two stopping conditions may be used by search result retrieval system 140 to stop the process, and therefore cause the candidate content items to be output. The first stopping condition may be represented by Equation 1:

$$UB\text{Stop} \triangleq \Sigma_{i=1}^{m} UB[i] \leq \Theta \qquad \text{Equation 1.}$$

In Equation 1, $\Theta$ corresponds to a threshold value associated with a lower bound term score of the k-th content item within sixth data structure 412. Therefore, when the upper bound of the i-th content item is less than or equal to the lower bound of the k-th content item, no more content items may be added to sixth data structure 412. The second stopping condition may be represented by Equation 2:

$$\forall D \in \text{docMap docHeap: } UB(D) \leq \Theta, \text{ where } UB(D) = \Sigma_{i=1}^{m}(D.\text{score}[i] > 0?D.\text{score}[i]: UB[i]) \qquad \text{Equation 2.}$$

Term list cleaning unit 510 may be configured to generate third data structure 406, as well as perform a CAS operation switching the pointers of third data structure 406 to second data structure 404. In response to determining that a cleaning condition has been satisfied, term list cleaning unit 510 may begin execution of the cleaning process. For example, in response to determining that Equation 1 has been satisfied, the cleaning process may begin. In the cleaning process, term list cleaning unit 510 may generate third data structure 406, and populate third data structure 406 with content item identifiers from second data structure 404, where each content item identifier populated to third data structure 406 has a corresponding lower bound term score that is greater than or equal to the threshold, $\Theta$. In other words, term list cleaning unit 510 generates third data structure 406 to remove content item identifiers from second data structure 404 that are not capable of being included within the top-k candidates. This, for instance, may be advantageous because it reduces the overall memory allocation of search result retrieval system 140, allowing the search result retrieval process to operate quicker. Additionally, term list cleaning unit 510 may allow for a check of Equation 2, thereby letting the search result retrieval process know when the number of entries within sixth data structure 412 and second data structure 404 are the same, indicating that the content items included within sixth data structure 412 include the top-k results, thus stopping the processing of the posting lists. In order to complete the cleaning process, term list cleaning unit 510 may replace second data structure 404 with third data structure 406. The replacement may occur via a single point swing, thereby flipping the global reference.

FIG. 5B is an illustrative flowchart of an exemplary process for storing term scores within a data structure, in accordance with various embodiments of the present teaching. Process 550 may, in a non-limiting embodiment, begin at step 552. At step 552, posting list information may be received. For instance, processor assignor 504 of query term based searcher 202 may receive the posting list information. A posting list may be associated with a particular term that is assigned to one of query term based searchers 202 for analysis. After decomposing a query's text into one or more terms, query decomposition unit 200 may assign each of the one or more terms to a separate one of query term based searchers 202. Additionally, in some embodiments, posting list information may also be provided to that query term based searcher 202, where the posting list information indicates a location of a particular posting list to be analyzed by that query term based searcher 202. For example, a posting list may be obtained from content item database 170 in response to receipt of the posting list information. As another example, the posting list may be accessed from the memory of search result retrieval system 140 in response to receipt of the posting list information.

At step 554, a number of available processors may be determined. As mentioned above, search result retrieval system 140 may correspond to a multi-core processing device including a plurality of processors. Depending on the functions of search result retrieval system 140, some (e.g., one or more) or none of the plurality of processors may currently be executing one or more tasks. Upon receipt of the posting list information, in one embodiment, query term based searcher 202 may obtain processor information indicating a number of available processors. For instance, available processor determiner 500 may obtain the processor information, and may provide the processor information to processor assignor 504. Based on the number of available processors, one or more of the available processors may be assigned by processor assignor 504 to a particular query term based searcher 202, where each query term based searcher 202 employs a different one (or more) processor(s) to perform their corresponding analysis.

At step 556, a first term score for a first entry in a posting list may be extracted. As mentioned previously, each posting list may include a number of entries, where each entry includes a content item identifier representing a content item from content item database 170, and a term score associated with that content item. The posting list may be analyzed by the assigned processor(s) to extract the term score for each entry of the posting sequentially. Therefore, the first entry in the posting list may be analyzed first, and the term score for that first entry may be extracted. At step 558, a content item identifier associated with the first entry may further be determined. In one embodiment, posting list reader/monitor 508 may analyze the posting list and may extract the term scores and content item identifiers for each entry.

At step 560, the term score may be stored in a data structure associated with the identifier. In some embodiments, in response to determining the identifier associated with the currently analyzed entry, data object generator/updater 506 may determine whether a data object within first data structure 402 exists for the identifier. If so, then data object generator/updater 506 may add the term score to the data object associated with that content item identifier. For example, if the posting list for a first term, $t_1$, is analyzed, and an entry for content item identifier 207 is seen, then data object generator/updater 506 may identify that a data object for content item identifier 207 exists within first data structure 402. Thus, the term score for first term $t_1$ for content item identifier 207 may be added to a vector of term scores for the data object of content item identifier 207. For example, if the term score is "20," then the vector for the data object associated with content item identifier 207 may include the value "20" for term $t_1$, "38" for term $t_2$, and "50" for term $t_3$. If, however, data object generator/updater 506 determines that no data object exists within first data structure 402 for the content item identifier, then data object generator/updater 506 may generate a new data object within data structure 402. The new data object will be associated with the content item identifier determined from the analysis of the posting list, and the extracted term score may be added to that data object's corresponding term score vector.

Figure 5C:
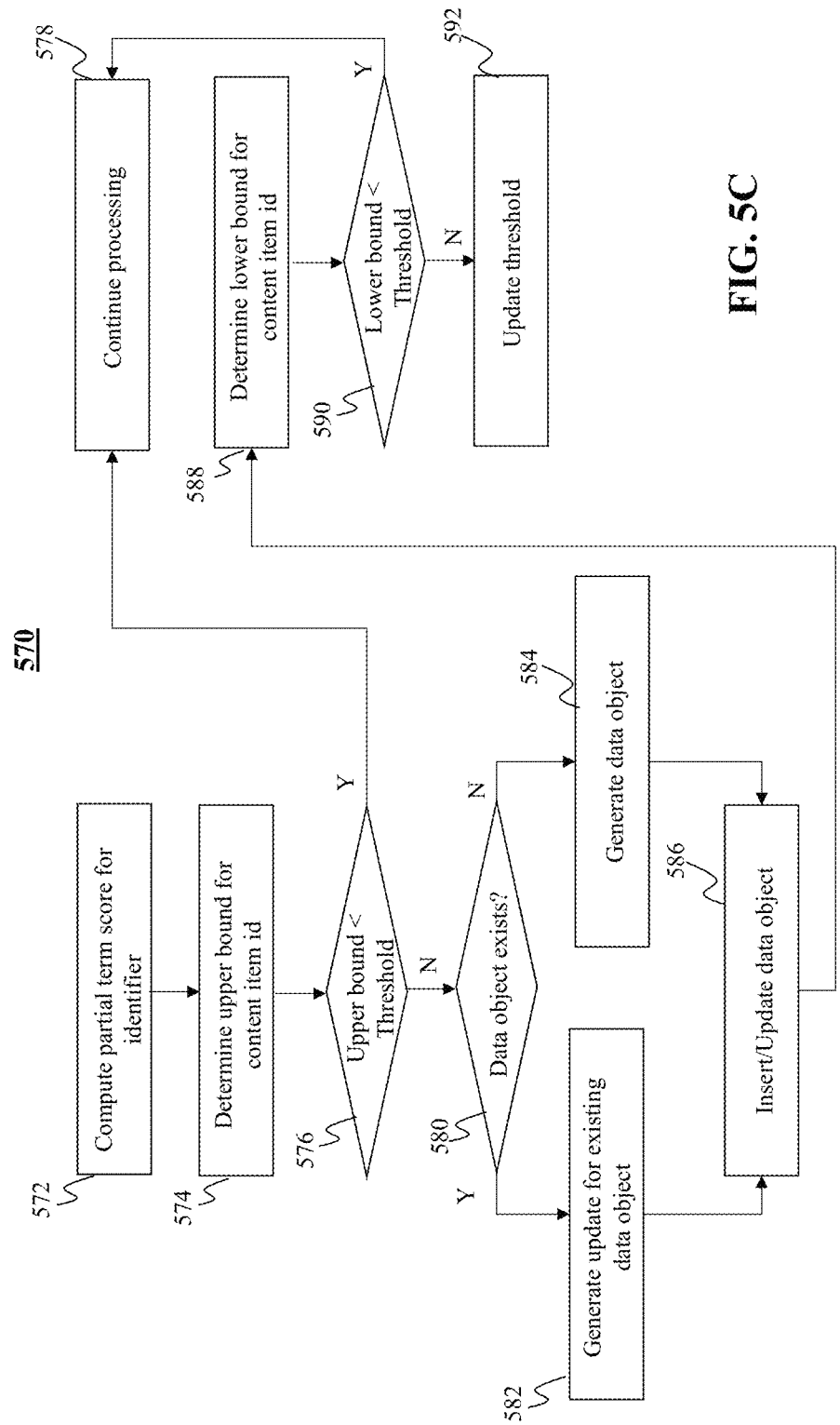
FIG. 5C is another illustrative flowchart of an exemplary process for analyzing a posting list, in accordance with various embodiments of the present teaching.

FIG. 5C is another illustrative flowchart of an exemplary process for analyzing a posting list, in accordance with various embodiments of the present teaching. Process 570, in a non-limiting embodiment, may begin at step 572. At step 572, a partial term score for a content item identifier may be computed. For instance, a partial term score for a data object within data structure 402 may be computed. The partial term score may be determined by summing the term scores currently stored within a particular data object's terms score vector. For example, looking at FIG. 4, the partial term score for content item identifier 810 may be "68" (e.g., 18+50). If a term score vector does include a value for a particular term (e.g., term $t_2$ for content item identifier 810), then that value may be set as zero (e.g., "0") for the partial term score computation.

At step 574, an upper bound for a content item identifier may be determined. The upper bound may be determined by taking the partial term score and adding in a current upper bound for any term score values not present within a content item identifier's term score vector. Continuing the aforementioned example, content item identifier 810 has no known value for term $t_2$, indicating that within the posting list for term $t_2$, content item identifier 810 has not yet been encountered. In this particular scenario, fifth data structure 410 may be employed to identify a current upper bound for that term's posting list. Therefore, in this example, the current upper bound for term $t_2$ may be a term score of "14." Thus, regardless of the entries within the posting list for term $t_2$ that have not yet been encountered, query term based searcher 202 will not see any term scores having a value greater than "14." Thus, the upper bound for content item identifier 810, in this example, may be "82" (e.g., 18+14+50).

At step 576, a determination may be made as to whether the upper bound for a content item identifier is less than a threshold value. The threshold value, in one embodiment, may correspond to the value of the lower bound of the k-th content item within sixth data structure 412. For instance, using the aforementioned example from FIG. 4, the threshold $\Theta=85$, and thus because the upper bound for content item identifier 810 is 82, which is less than 85, content item identifier 810 is not added to sixth data structure 412. This implies that, in the illustrative and non-limiting example, the content item associated with content item identifier 810 will not be included as one of the top-k content items returned. If, at step 586, it is determined that the upper bound for a particular content item identifier is less than the threshold, then process 570 may proceed to step 578. At step 578, the processing of a posting list by query term based searcher 202 may continue. For instance, a next entry within the posting list may be analyzed by the one or more processors assigned to that query term based searcher 202. However, if at step 576 it is determined that the upper bound of a content item identifier is equal to or greater than the threshold, $\Theta$, then process 570 may proceed to step 580.

At step 580, a determination may be made as to whether a data object for that content item identifier exists within first data structure 402. In one embodiment, step 580 may occur in parallel with steps 572-576. If, at step 580, it is determined that a data object for the content item identifier under analysis does not exist, then process 570 may proceed to step 584. At step 584, a data object may be generated. For example, data object generator/updater 508 may be configured to generate a data object for that content item identifier. If, however, at step 580, it is determined that a data object for the content item identifier already exists (e.g., within data structure 402), then process 570 may proceed to step 582. At step 582, an update for the existing content item identifier's data object may be generated. The update may indicate how the existing data object is to be modified, if at all.

After steps 582 and 584, process 570 may proceed to step 586. At step 586, the new data object, if generated at step 584, may be added to first data structure 402. In this particular scenario, the new data object is added to data structure 402, and the new data object may include the term score for that content item identifier. If, however, the data object already exists, as in the case of step 582, then the update to the data object may be performed (e.g., adding in the newly extracted term score).

Process 570 may further proceed to step 588. At step 588, a lower bound for a content item identifier may be determined. The lower bound may correspond to a value of the term score, based on the existing/known term scores for that data object, if that same content item identifier is not encountered at all within any other posting lists under analysis. As an illustrative example, looking at content item identifier 810 of FIG. 4, the term score vector includes values for terms $t_1$ and $t_3$ (e.g., 18 and 50, respectively). Therefore, the lower bound for this content item identifier would be 68, based on there being no current value for term $t_2$, and under the presumption that the posting list for term $t_2$ does not include an entry for content item identifier 810.

At step 590, a determination may be made as to whether the lower bound is less than the threshold (e.g., $\Theta$). If so, then process 570 may return to step 578, where the processing by query term based searcher 202 may continue. In this particular scenario, the content item identifier has an upper bound that is greater than the threshold but a lower bound that is less than the threshold. Therefore, at this particular point of the analysis, the content item identifier may not be added to sixth data structure 412. However, if, at step 590, it is determined that the lower bound is greater than or equal to the threshold, then process 570 may proceed to step 592. At step 592, the threshold may be updated to the lower bound of that content item identifier. For example, content item 134 as seen within FIG. 4, may have a lower bound of 85. Therefore, the threshold may be updated to $\Theta=85$, in this particular scenario, and content item identifier 134 may be added to sixth data structure 412.

Figure 6A:
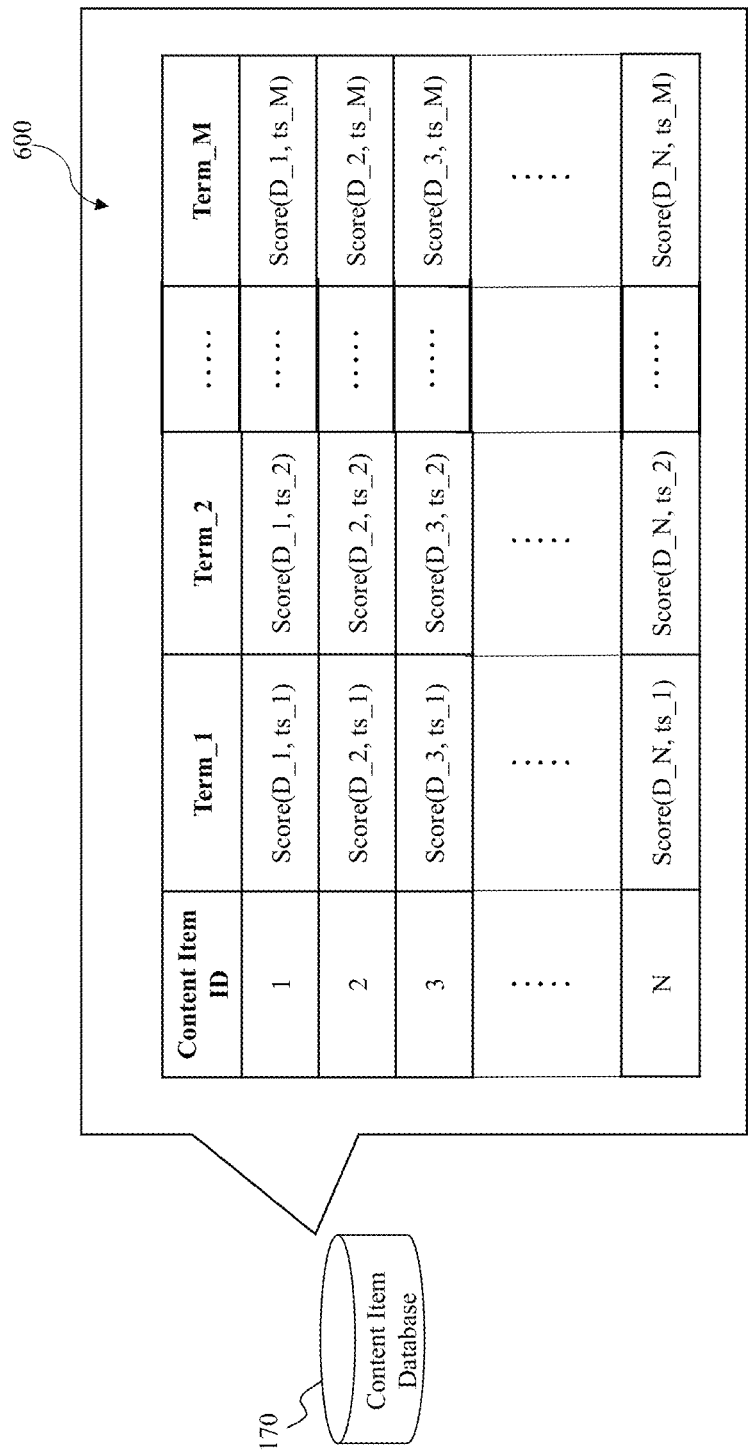
FIG. 6A is an illustrative diagram of an exemplary data structure stored within an exemplary content item database, in accordance with various embodiments of the present teaching.

FIG. 6A is an illustrative diagram of an exemplary data structure stored within an exemplary content item database, in accordance with various embodiments of the present teaching. As seen within FIG. 6A, content item database 170 may, in a non-limiting embodiment, include a data structure 600. Data structure 600 may include a plurality of rows, where each row is representative of a content item stored within content item database 170. The content items may be referenced by a content item identifier ("ID"), which is indicated by the values stored within the first column of data structure 600. Thus, if there are N content items within content item database 170—obtained via web crawling or any other content item retrieval system—then data structure 600 may include N rows, one for each content item. Furthermore, each content item may receive a unique content item identifier capable of being used to reference the corresponding content item within content item database 170.

A term score for each content item may be generated based on M predefined terms. Each term score may be computed based on a function, such as the function described by Equation 3:

$$\text{score}(D,q) \triangleq \Sigma_{i=1}^{m} \text{termscore}(D, t_i) \qquad \text{Equation 3.}$$

In Equation 3, score(D, q) may correspond to the score of a given content item (also referred to as "document") D for a query q. As mentioned previously, each query may include m terms such that the score for a given content item is equal to the sum of the term scores for each term of the query. Further, termscore(D, $t_i$) may correspond to the term score of a content item for the i-th term. Therefore, data structure 600 may store scores for each content item based on each term.

Figure 6B:
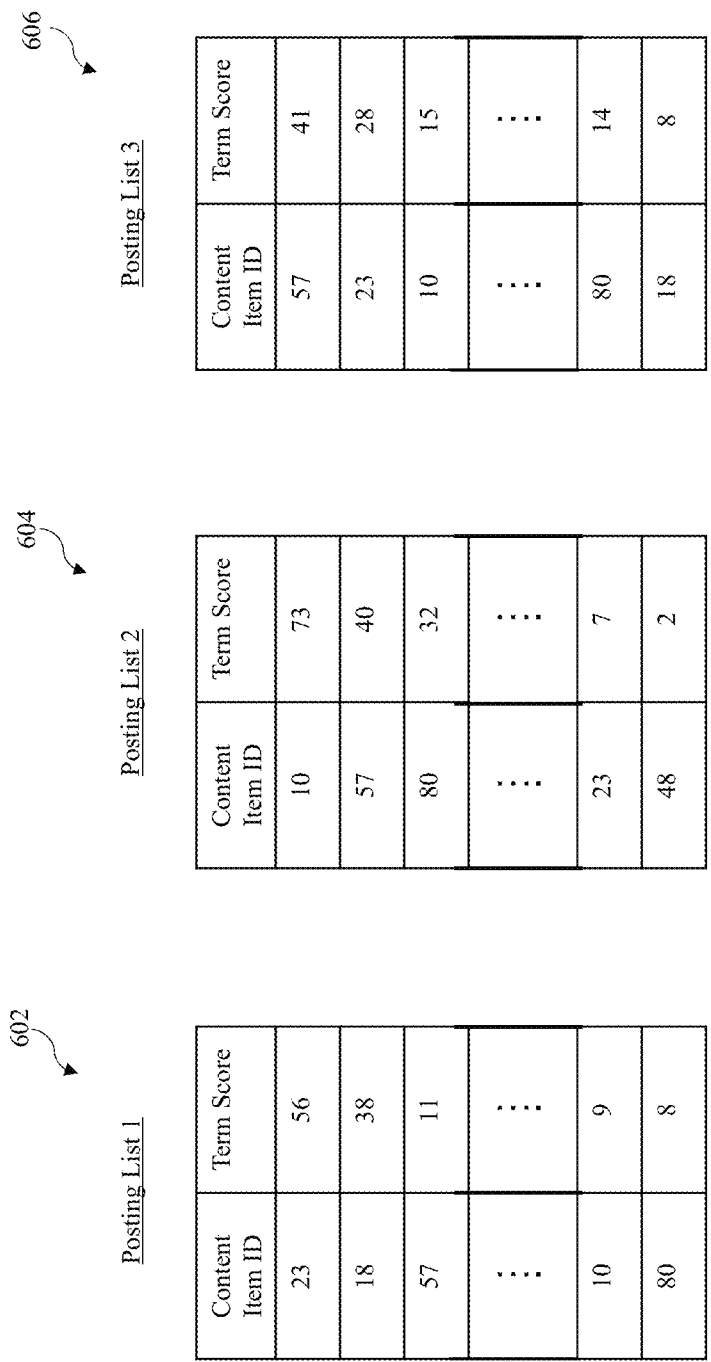
FIG. 6B is an illustrative diagram of exemplary posting lists, in accordance with various embodiments of the present teaching.

FIG. 6B is an illustrative diagram of exemplary posting lists, in accordance with various embodiments of the present teaching. In the illustrative embodiment, a first posting list 602, a second posting list 604, and a third posting list 606 are shown. Each posting list may be associated with one term from a query. For example, in response to identifying that a received query q, includes three terms, $t_1$, $t_2$, and $t_3$, posting list information for each of these three terms may be obtained. The posting list information may indicate which posting lists of the one or more posting lists stored within memory of search result retrieval system 140 correspond to which of terms $t_1$, $t_2$, and $t_3$. In the example embodiment, first posting list 602 may correspond to a first term $t_1$, second posting list 604 may correspond to a second term $t_2$, and third posting list 606 may correspond to a third term $t_3$. If the query were determined to include more or fewer terms, that additional posting lists, or fewer posting lists, may be obtained.

As seen in the illustrative embodiment, each posting list includes at least two pieces of information: a content item identifier—representing a content item within content item database 170, and a term score—indicating how relevant that content item is to that posting list's corresponding term. For example, looking at first posting list 602, content item identifier 23 may correspond to a content item (e.g., the content item associated with an entry within data structure 600 labeled with the identifier 23). Content item identifier 23 may have an associated term score of 56, indicating that, based on the term score function used to generate term scores, the content item associated with content item identifier 23 has a relevancy score—indicating how relevant that content item is to a term score—of 56 with respect to first term $t_1$.

In the illustrative embodiment, each posting list may be described as an "inverted list." For instance, the first entry in each of posting lists 602, 604, and 606 corresponds to a "largest" or "greatest" term score. Each subsequent entry within each posting list will have a term score that is equal to or less than the previous entry. For example, looking at first posting list 602, the second entry, corresponding to content item identifier 18, has a term score of 38, which is less than the term score for content item identifier 23. Additionally, each content item identifier will appear within each posting list at most one time. Therefore, if content item identifier 23 is encountered when being analyzed by the one (or more) processor(s) associated with a corresponding query term based searcher 202, there will be no other entry within first posting list 602 of content item identifier 23.

Figure 7A:
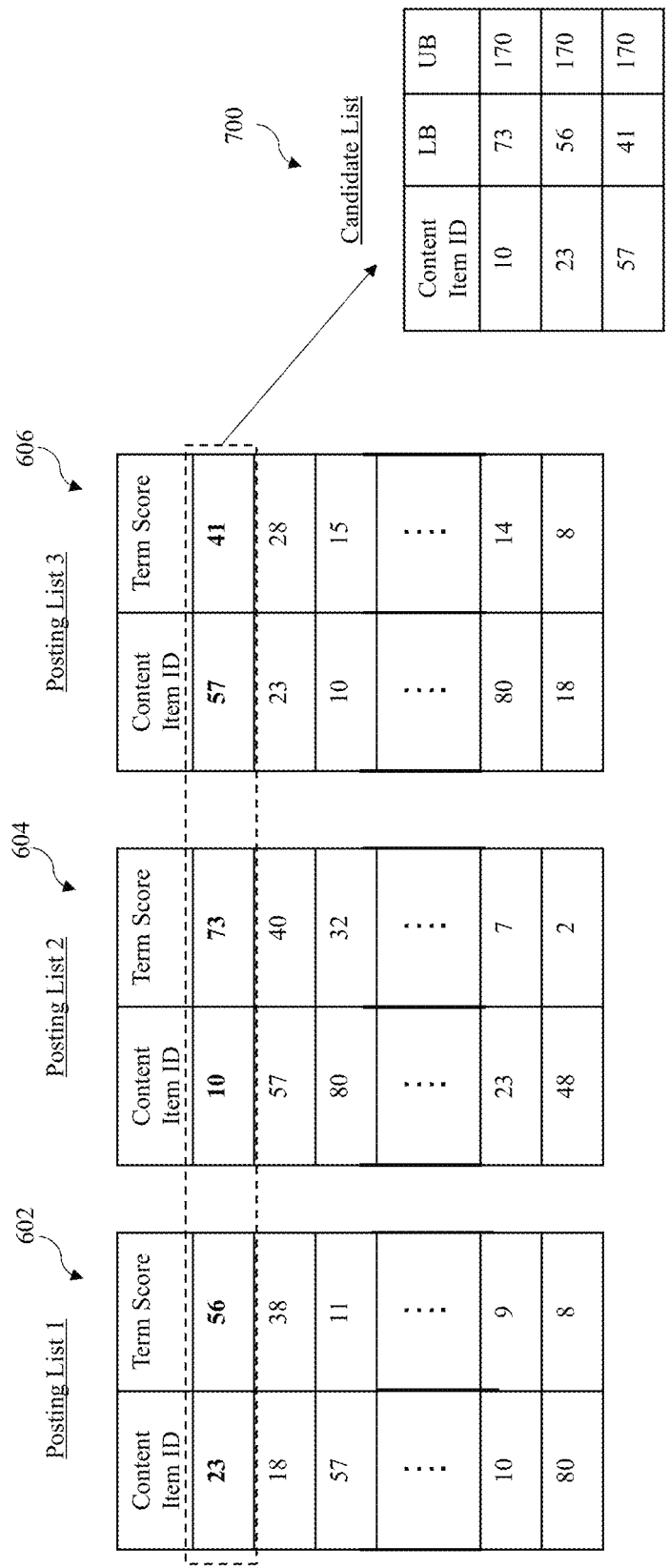
FIGS. 7A-C are exemplary diagrams of no random access analysis of posting lists, in accordance with various embodiments of the present teaching.
Figure 7B:
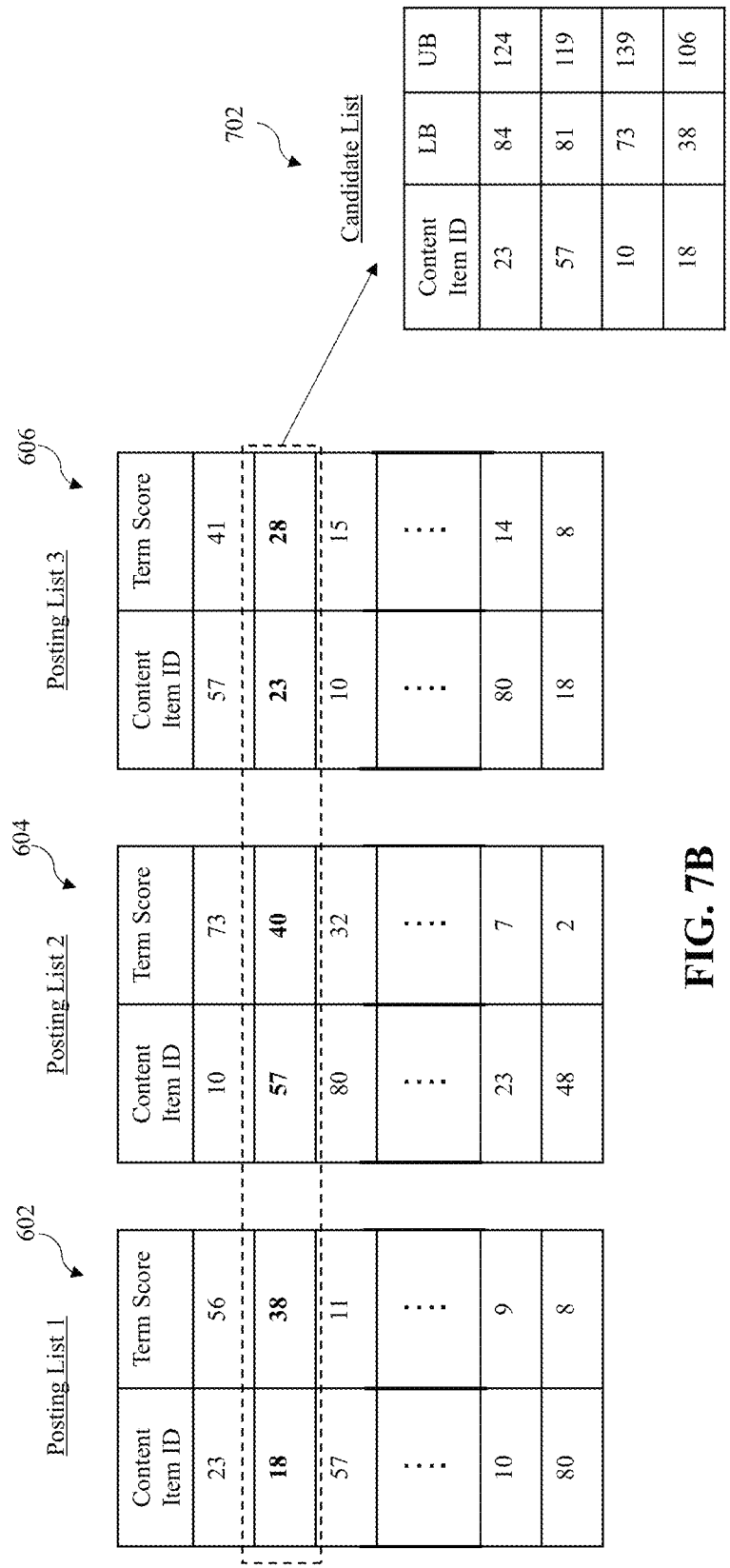
Figure 7C:
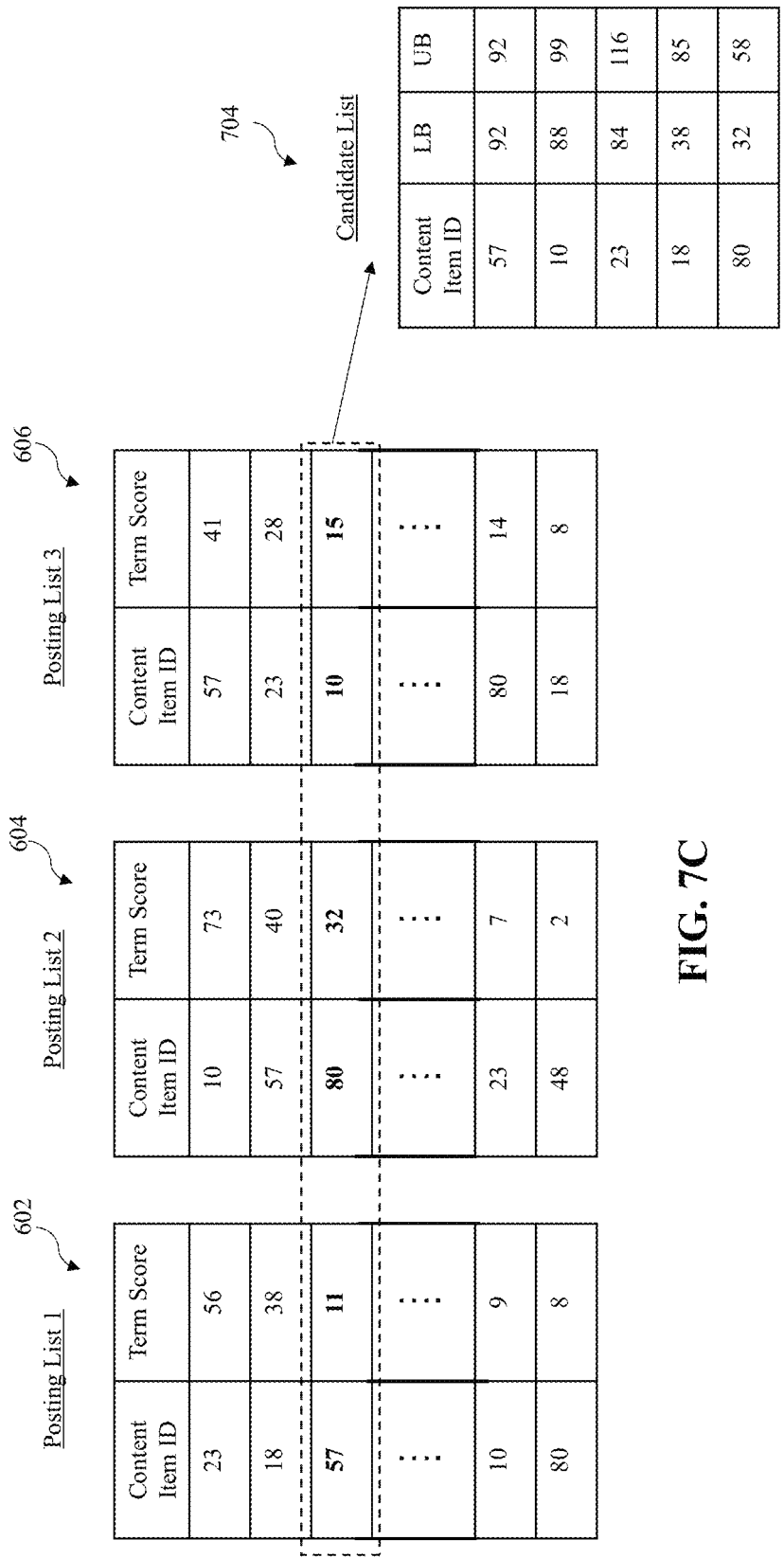

FIGS. 7A-C are exemplary diagrams of no random access analysis of posting lists, in accordance with various embodiments of the present teaching. With no random access ("NRA"), posting lists associated with each term from a query are analyzed in a non-random manner. In this particular scenario, the posting lists may be analyzed sequentially, however in one embodiment, each posting list may be analyzed uniquely by its own processor(s), and the results of the analysis of each posting list may be synchronized using data structure 400. Furthermore, the process by which the NRA analysis occurs maintains threshold $\Theta$, which corresponds to the score of the k-th candidate content item of a list of candidate content items. The NRA process may end when no other candidate content item can exceed the threshold score.

The NRA process may maintain data representing a lower bound term score and an upper bound term score for candidate content items based on partially computed term scores. Each content item identifier, and thus content item, encountered while scanning a posting list, is tracked. The upper bound, in one embodiment, may be defined as UB(D, $t_i$), for a content item D and a term $t_i$. Here, the upper bound may be the term score termscore(D, $t_i$) if the content item D has already been encountered. Otherwise, the upper bound may be represented as UB[i], which corresponds to the upper bound of the i-th content item. Similarly, the lower bound may be defined as LB(D, $t_i$). If the term score is known, then the lower bound may be known, and if the term score is not known, the lower bound may be initiated as being zero (e.g., "0"). To determine a content item's upper bound term score, Equation 4 is employed:

$$UB(D) \triangleq \Sigma_{i=1}^{m} UB(D,t_i) \quad \text{Equation 4;}$$

While determining the lower bound term score is described by Equation 5:

$$LB(D) \triangleq \Sigma_{i=1}^{m} LB(D,t_i) \quad \text{Equation 5.}$$

The NRA process may, in one embodiment, maintain the top-k content items in a data structure in accordance with those content item's lower bounds. The parameter k may corresponds to a configurable parameter representing a number of candidate content items to be returned upon the NRA process being complete. For example, k may correspond to 1,000 to 10,000 documents. The threshold value Θ may correspond to the smallest/lowest lower bound within the data structure.

In some embodiments, the NRA process may end in response to a stopping condition being satisfied. For instance, the stopping condition may correspond to Equation 1 being satisfied. Further, the stopping condition may further correspond to all content items that are not in the data structure of candidate content items having upper bounds lower than or equal to the threshold value Θ. Additionally, in some embodiments, the stopping condition may further correspond to the data structure of candidate content items not changing for more than a certain amount of time Δt (e.g., a few milliseconds).

In FIG. 7A, posting lists 602-606 are presented. In accordance with one embodiment, the NRA process may begin by analyzing each posting list's first entry. While in the example embodiment the first entry of each posting list is analyzed in parallel, because each posting list may have their analyzation task being executed by different processors, the analysis of each posting list may proceed independently of one another.

The first entry from first posting list 602, corresponding to a first term $t_1$ from a query, may correspond to content item identifier 23, having a term score 56. The first entry from second posting list 604, corresponding to a second term $t_2$ from the query, may correspond to content item identifier 10 having a term score 73. The first entry from third posting list 606, corresponding to a third term $t_3$ from the query, may correspond to content item identifier 57 having a term score 41.

Data structure 700, which may correspond to a candidate content item list, may be populated with an entry for each content item identifier. Furthermore, for each content item identifier, a lower bound and an upper bound for that content item may be included within data structure 700. For instance, content item identifier 10 may have a lower bound equal to 73, representative of the term score from second posting list 604 and assuming that neither of posting lists 602 and 606 include an entry for content item identifier 10. The upper bound for content item identifier 10 may be equal to 170, which corresponds to the sum of the known upper bounds for each posting list. In this particular example, since the first entry of each posting list is all that is known, the upper bound for each content item identifier is 170 (e.g., 56+73+41). Similarly, the lower bound and upper bound for content item 23 are 56 and 170, respectively, while the lower bound and the upper bound for content item 57 are 41 and 170, respectively. Furthermore, data structure 700 may be organized in descending order by lower bound. Thus, since content item identifier 10 has a greatest lower bound (e.g., 73), it is placed at the first position within data structure 700, followed by content items 23 and 57, respectively.

Moving to FIG. 7B, the second entry for each of posting lists 602-606 are analyzed, and the values for the candidate content item list, as represented by data structure 702, are updated. In both posting lists 604 and 606, the second entries includes a content item identifier that previously was seen by one of the posting lists 602-606 during the first entry analysis. For example, second posting list 604 includes content item identifier 57 having terms score 40, and third posting list 606 includes content item identifier 23 having term score 28. These values may be used to update the lower and upper bounds for those content item identifiers within the candidate content item list, as seen by data structure 702. Furthermore, first posting list 602 includes content item identifier 18 having a term score 38.

Based on the values for the entries analyzed from each of posting lists 602-604, the candidate content item list may be updated to reflect the new lower bounds and upper bounds associated with each content item identifier. For example, content item identifier 23 now has a highest position within data structure 702, as its lower bound term score of 84 is greater than the lower bound term scores of content item identifiers 57, 10, and 18. The lower bound term score of 84 for content item identifier 23 may be computed by summing the term scores from posting lists 602 and 606, 56 and 28, respectively, and setting the contribution from second posting list 604 to be zero, since content item identifier 23 has not yet been encountered in that posting list. The upper bound term score for content item identifier 23 may be computed by using the term scores from posting lists 602 and 606, as well as a current upper bound term score for term $t_2$, which is corresponds to the value 40. Thus, the upper bound for content item identifier 23 is 124 (e.g., 56+40+28). A similar process occurs for the remaining content identifiers within data structure 702.

Moving to FIG. 7C, the third entry for each of posting lists 602-606 are analyzed, and the values for the candidate content item list, as represented by data structure 704, are updated. In both posting lists 602 and 606, the third entries include a content item identifier that previously was seen by one of the posting lists 602-606 during the first entry and/or second entry analysis. For example, first posting list 602 includes content item identifier 57 having terms score 11, and third posting list 606 includes content item identifier 10 having term score 15. These values may be used to update the lower and upper bounds for those content item identifiers within the candidate content item list, as seen by data structure 704. Furthermore, second posting list 604 includes content item identifier 80 having a term score 32.

Based on the values for the entries analyzed from each of posting lists 602-606, the candidate content item list may be updated to reflect the new lower bounds and upper bounds associated with each content item identifier. For example, content item identifier 57 now has a highest position within data structure 704, as its lower bound term score of 92 is greater than the lower bound term scores of content item identifiers 10, 23, 18, and 80. Interestingly, in this particular example, content item identifier 57 has now been encountered in each of posting lists 602-606. Therefore, the upper bound and the lower bound are both known for content item identifier 57, and the upper bound and lower bound are equal to one another. For example, the contributions to the term score for content item identifier 57 are 11, 40, and 41, corresponding to posting lists 602, 604, and 606, respectively. Therefore, the minimum score for content item identifier 57 is 92, and the maximum score is also 92.

The lower bound term score of 88 for content item identifier 10 may be computed by summing the term scores from posting lists 604 and 606, 73 and 15, respectively, and setting the contribution from second posting list 602 to be zero, since content item identifier 10 has not yet been encountered in that posting list. The upper bound term score for content item identifier 10 may be computed by using the term scores from posting lists 604 and 606, as well as a current upper bound term score for term $t_1$, which is corresponds to the value 11. Thus, the upper bound for content item identifier 10 is 99 (e.g., 11+73+15). A similar process occurs for the remaining content identifiers within data structure 704. If the parameter k corresponds to 3, for example, then the content items added to sixth data structure 412 based on the candidate content item list from data structure 704 may include content item identifiers 57, 10, and 23.

Figure 8A:
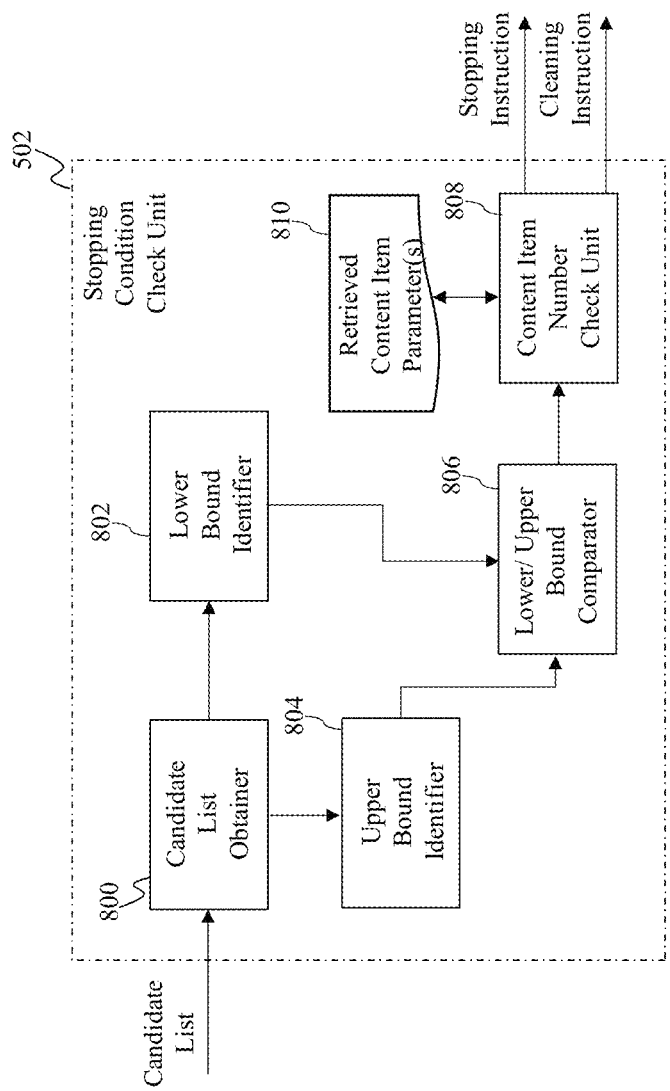
FIG. 8A is an illustrative diagram of an exemplary stopping condition checking unit, in accordance with various embodiments of the present teaching.

FIG. 8A is an illustrative diagram of an exemplary stopping condition checking unit, in accordance with various embodiments of the present teaching. In the illustrative embodiment, stopping condition checking unit 502 may include a candidate list obtainer 800, a lower bound identifier 802, an upper bound identifier 804, a lower/upper bound comparator 806, and a content item number check unit 808. Each of candidate list obtainer 800, lower bound identifier 802, upper bound identifier 804, lower/upper bound comparator 806, and content item number check unit 808 may be implemented via one or more computer programs stored within the memory of search result retrieval system 140. For instance, one or more processors of the plurality of processors associated with search result retrieval system 140 may be configured to execute one or more instructions (e.g., computer program(s)) to cause the functionalities associated with one or more of candidate list obtainer 800, lower bound identifier 802, upper bound identifier 804, lower/upper bound comparator 806, and content item number check unit 808 to be performed.

Candidate list obtainer 800 may, in one embodiment, may be configured to receive various instance of a candidate content item list (e.g., one or more of data structures 700-704). In response, candidate list obtainer 800 may provide the candidate content list data to each of lower bound identifier 802 and upper bound identifier 804. Lower bound identifier 802 may, in one embodiment, be configured to identify the lower bound term score for each content item identifier included within the candidate content item list. For example, looking at data structure 704 of FIG. 7C, the lower bounds identified by lower bound identifier 802 may be 92, 88, 84, 38, and 32, for content item identifiers 57, 10, 23, 18, and 80, respectively. Upper bound identifier 804, in one embodiment, may be configured to identify the upper bound term score for each content item identifier included within the candidate content item list. Continuing the previous example, the upper bounds identifier by upper bound identifier 804 may be 92, 99, 116, 85, and 58, for content item identifiers 57, 10, 23, 18, and 80, respectively.

Each of the lower bound term scores and the upper bound term scores for the corresponding content item identifiers may be provided to lower/upper bound comparator 806. Lower/upper bound comparator 806 may be configured to compare the lower and upper bounds for each content item to determine which content item identifier has a largest lower bound and a smallest lower bound. Furthermore, lower/upper bound comparator 806 may be configured to generate comparison information indicating which, if any, upper bounds are smaller than another content item identifier's corresponding lower bound. The lower bounds, upper bounds, and comparison information may be provided to content item number check unit 808.

Content item number check unit 808 may be configured to determine whether there are any upper bounds less than a threshold value $\Theta$. The threshold value $\Theta$ may correspond to a lower bound of the k-th content item identifier. The parameter k may be selected from retrieved content item parameter(s) 810, indicating a size of the top-k results. Therefore, if content item number check unit 808 determines that Equation 1 holds (e.g., upper bounds less than a threshold value $\Theta$), then stopping condition check unit 502 may be configured to output a stopping instruction, causing search term query searchers 202 to stop executing their analysis of posting lists. Additionally or alternatively, stopping condition check unit 502 may be configured to generate a stopping instruction in response to determining that all content items that are not in the data structure of candidate content items having upper bounds lower than or equal to the threshold value $\Theta$. Further still, in some embodiments, the stopping condition may further correspond to the data structure of candidate content items not changing for more than a certain amount of time $\Delta t$ (e.g., a few milliseconds). In some embodiments, in response to determining that one or more of the stopping conditions have been satisfied, a cleaning instruction may be generated and output from stopping condition check unit 502.

Figure 8B:
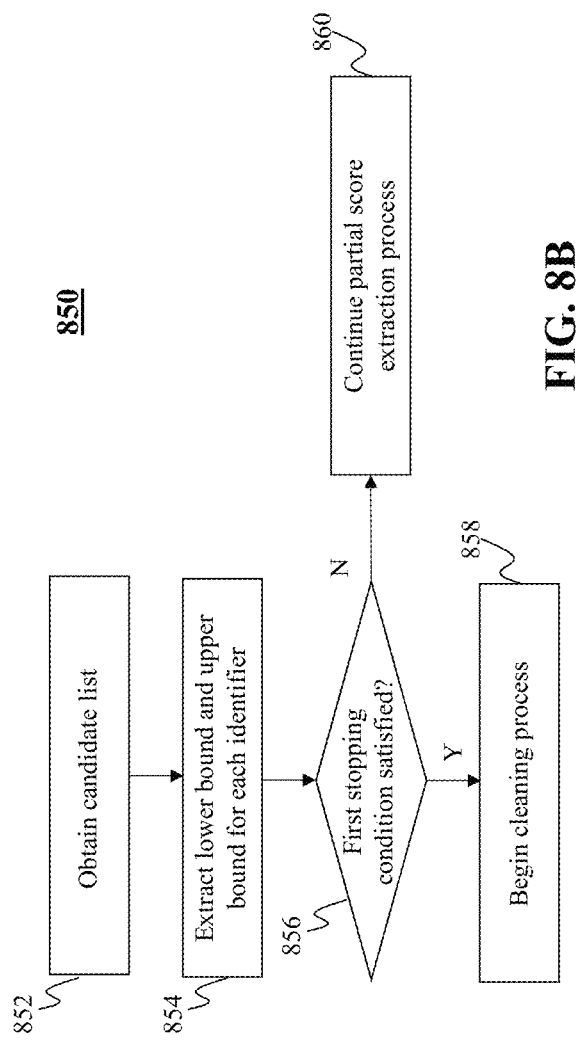
FIG. 8B is an illustrative process of an exemplary process for determining whether a stopping condition has been satisfied, in accordance with various embodiments of the present teaching.

FIG. 8B is an illustrative process of an exemplary process for determining whether a stopping condition has been satisfied, in accordance with various embodiments of the present teaching. Process 850, in a non-limiting embodiment, may begin at step 852. At step 852, a candidate content item list may be obtained. For instance, candidate list obtainer 800 may obtain the candidate content item list from data structure 400. At step 854, a lower bound and an upper bound for each content item identifier included within the candidate content item list may be extracted. For instance, looking at data structures 700-704 (which may be similar to data structure 412), each entry within those data structures may include a content item identifier and that identifier's corresponding lower bound and upper bound for a particular iteration. At step 856, a determination may be made as to whether a first stopping condition has been satisfied. For example, the first stopping condition may correspond to Equation 1 being satisfied. If, at step 856, it is determined that the stopping condition has been satisfied, then process 850 may proceed to step 858. At step 858, the cleaning processing may begin (e.g., by implementing the tasks associated within term list cleaning unit 510, as described in greater detail below. If, however, at step 856, it is determined that the first stopping condition has not been satisfied, then process 850 may proceed to step 860. At step 860, the partial score extraction process may continue for each posting list, as executed by each processor for a particular posting list.

Figure 9A:
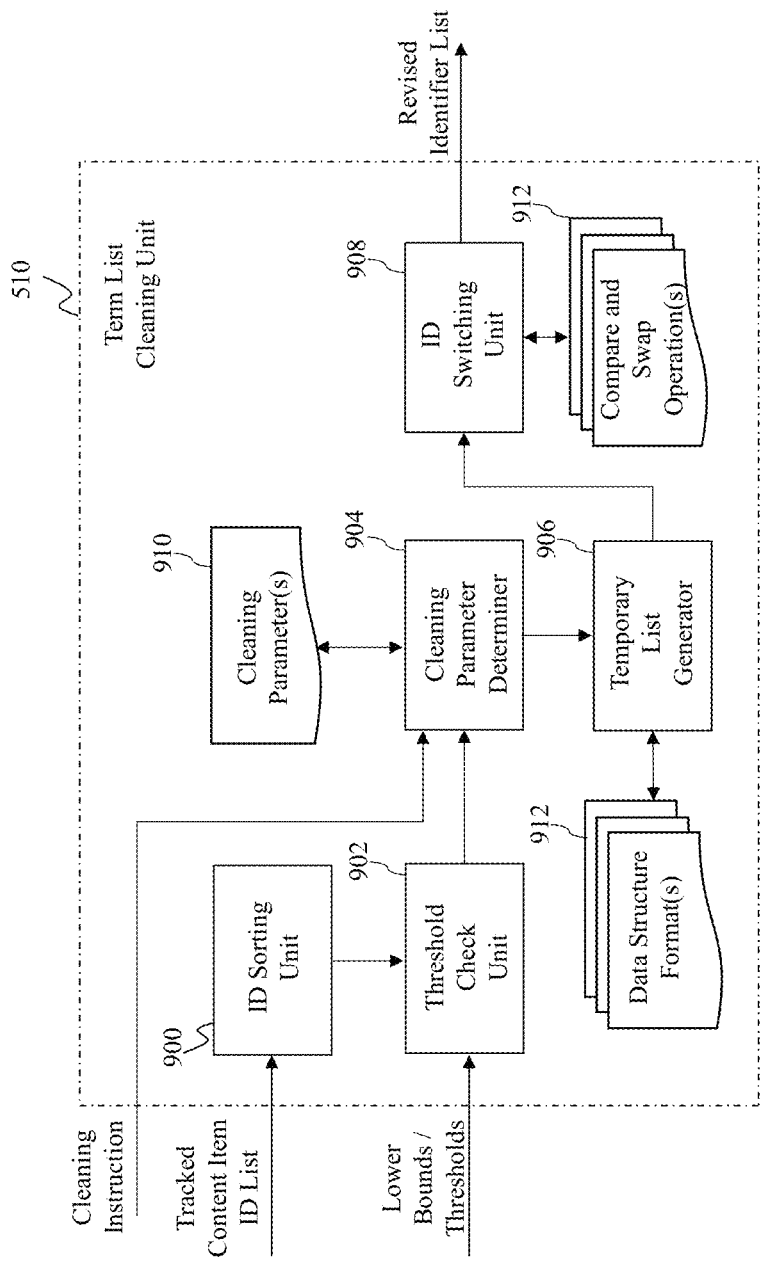
FIG. 9A is an illustrative diagram of an exemplary term list cleaning unit, in accordance with various embodiments of the present teaching.

FIG. 9A is an illustrative diagram of an exemplary term list cleaning unit, in accordance with various embodiments of the present teaching. Term list cleaning unit 510, in the illustrative embodiment, may include an ID sorting unit 900, a threshold check unit 902, a cleaning parameter determiner 904, a temporary list generator 906, and an ID switching unit 908. Each of ID sorting unit 900, threshold check unit 902, cleaning parameter determiner 904, temporary list generator 906, and ID switching unit 908 may be implemented via one or more computer programs stored within the memory of search result retrieval system 140. For instance, one or more processors of the plurality of processors associated with search result retrieval system 140 may be configured to execute one or more instructions (e.g., computer program(s)) to cause the functionalities associated with one or more of ID sorting unit 900, threshold check unit 902, cleaning parameter determiner 904, temporary list generator 906, and ID switching unit 908 to be performed.

ID sorting unit 900 may, in one embodiment, be configured to receive a tracked content item identifier list from posting list reader/monitor 508. For instance, ID sorting unit 900 may receive data representative of the contents of second data structure 404. As mentioned above, data structure 404 may include a listing of the various content item identifiers encountered thus far from posting lists analyzed by query term based searchers 202. The content item identifiers from second data structure 404 may in turn be identified, along with their corresponding lower bounds, by ID sorting unit 900. Threshold check unit 902 may be configured to receive the content item identifier and lower bound information from ID sorting unit 900, as well as the lower bounds/thresholds associated with sixth data structure 412. The lower bounds/threshold may indicate a current threshold—and thus lower bound—of the k-th content item from sixth data structure 412.

Cleaning parameter determiner 904 may determine, based on one or more cleaning parameters 910, whether a cleaning instruction has been received. In some embodiments, cleaning parameter determiner 904 may receive an indication that a cleaning condition has been satisfied. The various cleaning parameters 910 may indicate a type of cleaning to be performed. For example, in response to determine that Equation 1 has been satisfied, an instruction to commence the cleaning of second data structure 404 may be generated and provided to term list cleaning unit 510. The cleaning parameter may indicate that the cleaning to be performed corresponds to reducing contention associated with second data structure 404 by removing content item identifiers that no longer can contribute to the top-k results.

Temporary list generator 906, in one embodiment, may be configured to generate a temporal content item identifier list. For example, temporary list generator 906 may be configured to generate third term structure 406 using data structure formats 912. For example, data structure formats 912, in addition to cleaning parameters 910, may indicate that the temporary content item identifier list is to be generated and populated with content item identifiers having lower bounds greater than the threshold value $\Theta$. After generating the temporary content item identifier list (e.g., data structure 406), ID switching unit 908 may be configured to perform one or more operations 912, such as compare and swap ("CAS") operations, to the temporary candidate content item identifier list (e.g., third data structure 406) and the content item identifier list (e.g., second data structure 404). Thus, the temporary data structure 406 may be swapped with second data structure 404, thus leaving second data structure 404 as now only including content item identifiers whose lower bound equals or exceeds threshold value $\Theta$. The revised identifier list (e.g., the post CAS operation second data structure 404) may then be stored within data structure 400.

FIG. 9B is an illustrative flowchart of an exemplary process for performing a cleaning operation to a data structure, in accordance with various embodiments of the present teaching. Process 950, in a non-limiting embodiment, may begin at step 952. At step 952, a tracked content item identifier list may be obtained. For instance, ID sorting unit 900 may obtain the tracked content item ID list (e.g., data structure 404). At step 954, a cleaning instruction may be received. For example, in response to determining that Equation 1 has been satisfied, a cleaning instruction may be generated and sent to term list cleaning unit 510. At step 956, a temporary content item identifier list may be generated. For example, temporary list generator 906 may generate a temporary content item identifier list (e.g., third term structure 406) based on one or more cleaning parameters 910 and/or data structure formats 912. At step 958, the temporary content item identifier list may be populated with content item identifiers having a lower bound greater than or equal to threshold $\Theta$. At step 960, a CAS operation may be performed to the temporary content item data structure to switch the temporary content item data structure with the tracked content item identifier data structure. For example, ID switching unit 908 may switch the global points of third data structure 406 to that of second data structure 404. At step 962, the revised identifier list may be output by term list cleaning unit 510. For instance, the revised second data structure 404 including content item identifiers whose lower bound term score exceeds threshold $\Theta$ may be stored within data structure 400.

Figure 10A:
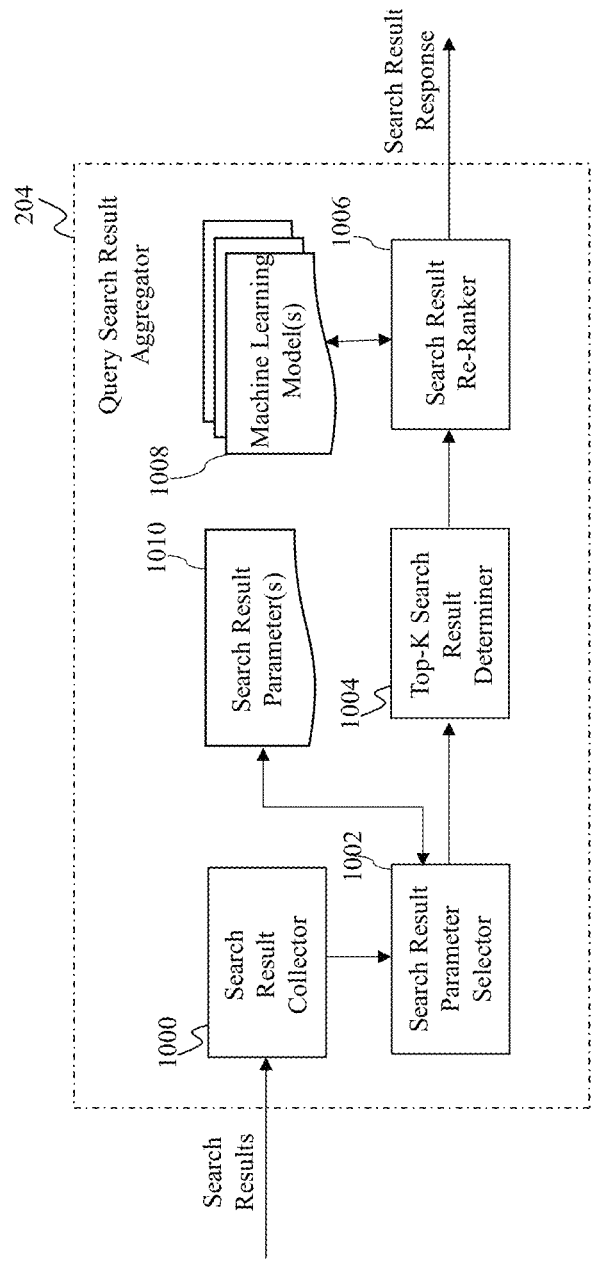
FIG. 10A is an illustrative diagram of an exemplary query search result aggregator, in accordance with various embodiments of the present teaching.

FIG. 10A is an illustrative diagram of an exemplary query search result aggregator, in accordance with various embodiments of the present teaching. Query search result aggregator 204 may include, in the illustrative embodiment, a search result collector 1000, a search result parameter selector 1002, a top-k search result determiner 1004, and a search result re-ranker 1006. Each of search result collector 1000, search result parameter selector 1002, top-k search result determiner 1004, and search result re-ranker 1006 may be implemented via one or more computer programs stored within the memory of search result retrieval system 140. For instance, one or more processors of the plurality of processors associated with search result retrieval system 140 may be configured to execute one or more instructions (e.g., computer program(s)) to cause the functionalities associated with one or more of search result collector 1000, search result parameter selector 1002, top-k search result determiner 1004, and search result re-ranker 1006 to be performed.

Search result collector 1000 may, in one embodiment, be configured to receive the search results from each query term based searcher 202. The search results, for example, may include data structure 412, indicating the content item identifier heap of content item identifiers whose lower bounds are greater than or equal to threshold value $\Theta$. Search result parameter selector 1002 may be configured to select a search result parameter 1010. The search result parameter 1010 may correspond to the value "k" for the top-k results. In some embodiments, the search result parameter may be predefined. For instance, depending on the number of query terms, a different search result parameter 1010 may be used. As an illustrative example, the search result parameter k may be in the range of 1,000-10,000, corresponding to 1,000-10,000 content items capable of being included as the top-k search results. Persons of ordinary skill in the art will recognize that this is merely exemplary, and any suitable value for k may be employed.

Top-k search result determiner 1004 may be configured to apply the selected search result parameter 1010 to the search results collected, to generate the top-k search results. The top-k search results may then be provided to search result re-ranker 1006. As mentioned previously, search result re-ranker 1006 may be configured to employ one or more machine learning models 1008 to re-rank the top-k search results. The final search results may then be output from query search result aggregator 204 as a response to the query. The response, including the search results—re-ranked based on the top-k search result parameter—may then be provided from search result retrieval system 140 to a requesting user device 110.

FIG. 10B is an illustrative diagram of an exemplary process for outputting a search result response, in accordance with various embodiments of the present teaching. Process 1050, in a non-limiting embodiment, may begin at step 1052. At step 1052, search results for each term may be collected. For example, search result collector 1000 may receive the search results (e.g., sixth data structure 412) in response to determining that the processing of the posting lists has completed (e.g., when sixth data structure 412 and second data structure 404 have a same number of entries). At step 1054, a number of search results to be included may be determined. For example, search result parameter selector 1002 may determine a search result parameter 1010 to use as a basis for formulating the top-k results. At step 1056, the top-k search result list may be generated. In some embodiments, steps 1054 and 1056 may be omitted as sixth data structure 412 may already encompass the top-k results. At step 1058, search result list re-ranking may be performed. For instance, search result re-ranker 1006 may employ one or more machine learning models 1008 to re-rank the top-k results. At step 1060, the search result response (e.g., a response to the query including the re-ranked top-k results) may be output by search retrieval system 140.

Figure 11:
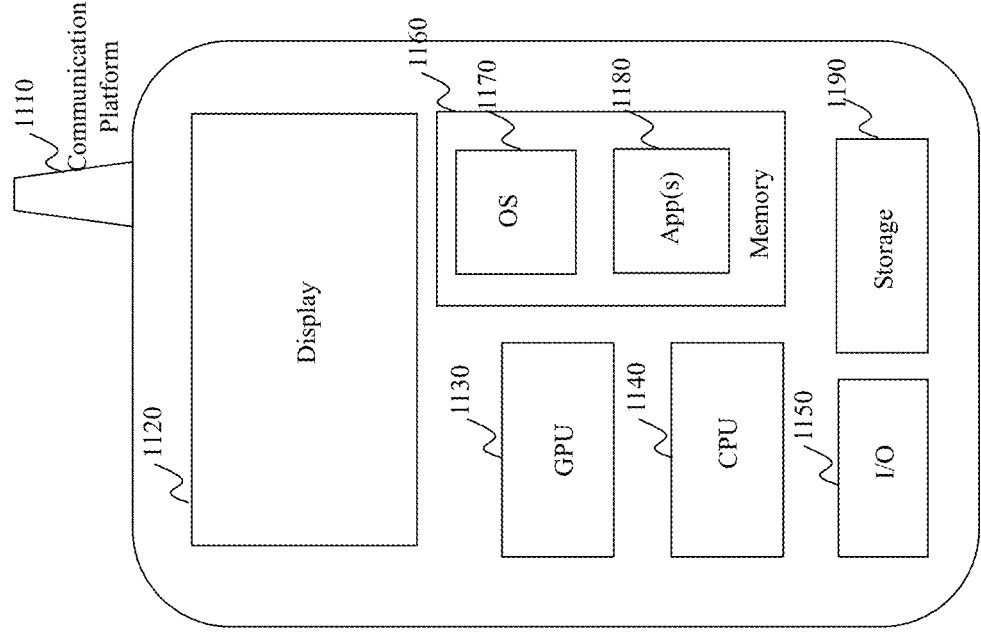
FIG. 11 is an illustrative diagram of an exemplary mobile device architecture that may be used to realize a specialized system implementing the present teaching in accordance with various embodiments.

FIG. 11 is an illustrative diagram of an exemplary mobile device architecture that may be used to realize a specialized system implementing the present teaching in accordance with various embodiments. In this example, the user device on which the search result retrieval systems and methods is implemented corresponds to a mobile device 1100, including, but is not limited to, a smart phone, a tablet, a music player, a handled gaming console, a global positioning system (GPS) receiver, and a wearable computing device (e.g., eyeglasses, wrist watch, etc.), or in any other form factor. Mobile device 1100 may include one or more central processing units ("CPUs") 1140, one or more graphic processing units ("GPUs") 1130, a display 1120, a memory 1160, a communication platform 1110, such as a wireless communication module, storage 1190, and one or more input/output (I/O) devices 1140. Any other suitable component, including but not limited to a system bus or a controller (not shown), may also be included in the mobile device 1100. As shown in FIG. 11 a mobile operating system 1170 (e.g., iOS, Android, Windows Phone, etc.), and one or more applications 1180 may be loaded into memory 1160 from storage 1190 in order to be executed by the CPU 1140. The applications 11280 may include a browser or any other suitable mobile apps for carrying out search result retrieval on mobile device 1100. User interactions with the content may be achieved via the I/O devices 1140 and provided to the search result retrieval system 140 via network(s) 120.

To implement various modules, units, and their functionalities described in the present disclosure, computer hardware platforms may be used as the hardware platform(s) for one or more of the elements described herein (e.g., search result retrieval system 140). The hardware elements, operating systems and programming languages of such computers are conventional in nature, and it is presumed that those skilled in the art are adequately familiar therewith to adapt those technologies to appropriate settings as described herein. A computer with user interface elements may be used to implement a personal computer (PC) or other type of work station or terminal device, although a computer may also act as a server if appropriately programmed. It is believed that those skilled in the art are familiar with the structure, programming and general operation of such computer equipment and as a result the drawings should be self-explanatory.

Figure 12:
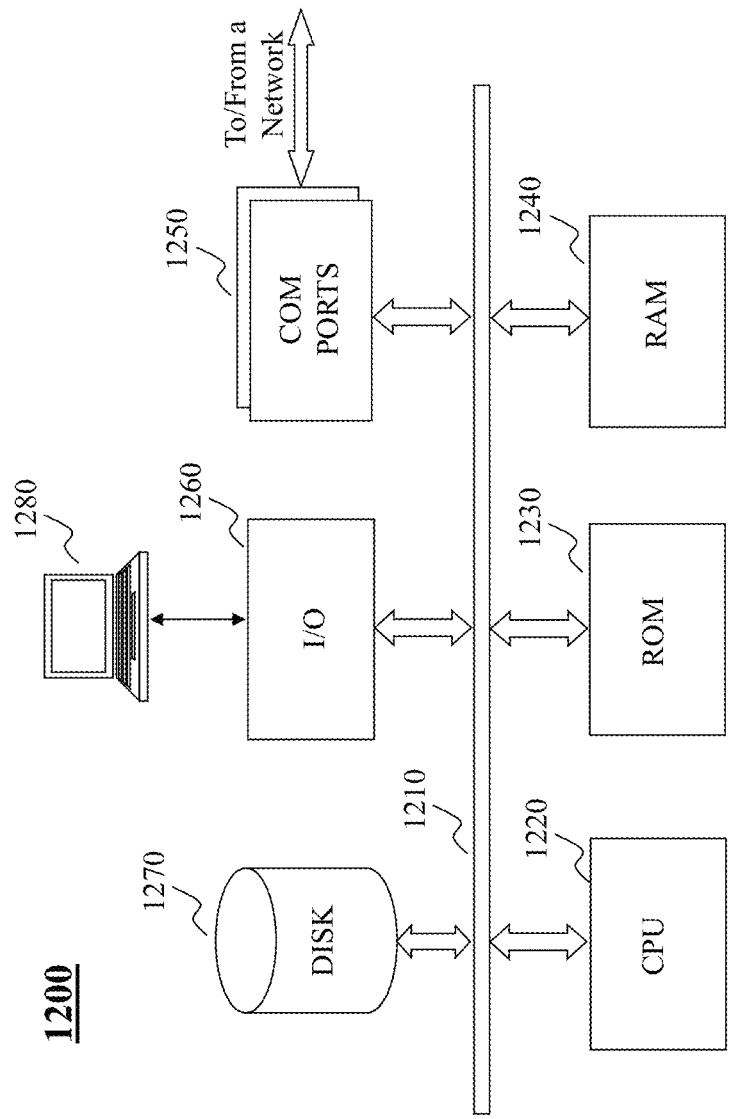
FIG. 12 is an illustrative diagram of an exemplary computing device architecture that may be used to realize a specialized system implementing the present teaching in accordance with various embodiments.

FIG. 12 is an illustrative diagram of an exemplary computing device architecture that may be used to realize a specialized system implementing the present teaching in accordance with various embodiments. Such a specialized system incorporating the present teaching has a functional block diagram illustration of a hardware platform, which includes user interface elements. The computer may be a general purpose computer or a special purpose computer. Both can be used to implement a specialized system for the present teaching. This computer 1200 may be used to implement any component of search result retrieval management techniques, as described herein. For example, the search result retrieval system as described herein may be implemented on a computer such as computer 1200, via its hardware, software program, firmware, or a combination thereof. Although only one such computer is shown, for convenience, the computer functions relating to fraudulent network detection as described herein may be implemented in a distributed fashion on a number of similar platforms, to distribute the processing load.

Computer 1200, for example, includes COM ports 1250 connected to and from a network connected thereto to facilitate data communications. Computer 1200 also includes a central processing unit (CPU) 1220, in the form of one or more processors, for executing program instructions. The exemplary computer platform includes an internal communication bus 1210, program storage and data storage of different forms (e.g., disk 1270, read only memory (ROM) 1230, or random access memory (RAM) 1240), for various data files to be processed and/or communicated by computer 1200, as well as possibly program instructions to be executed by CPU 1220. Computer 1200 also includes an I/O component 1260, supporting input/output flows between the computer and other components therein such as user interface elements 1280. Computer 1200 may also receive programming and data via network communications.

Hence, aspects of the methods of detecting fraudulent networks and/or other processes, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, in connection with search result retrieval system. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine-readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a physical processor for execution.

Those skilled in the art will recognize that the present teachings are amenable to a variety of modifications and/or enhancements. For example, although the implementation of various components described above may be embodied in a hardware device, it may also be implemented as a software only solution—e.g., an installation on an existing server. In addition, the search result retrieval techniques as disclosed herein may be implemented as a firmware, firmware/software combination, firmware/hardware combination, or a hardware/firmware/software combination.

While the foregoing has described what are considered to constitute the present teachings and/or other examples, it is understood that various modifications may be made thereto and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A method for retrieving documents for a search, the method being implemented on a computing device comprising a plurality of processors, memory, and a communication platform connected to a network, the method comprising:
receiving a query comprising a plurality of terms;
obtaining, for each of the plurality of terms, a posting list of one or more content items ranked based on term scores associated with a corresponding one or more content items, wherein a term score is indicative of a level of relevance between a corresponding content item in the posting list and the term;
generating a candidate list of content items based on the plurality of posting lists, wherein the step of generating the candidate list comprises:
selecting, from each of the posting lists, a first content item having a rank with a same first value in each of the posting lists,
retrieving, for each of the first content items, from the respective posting lists, an associated term score of the first content item, and
creating the candidate list with the first content items that are ranked based on their corresponding term scores;
updating the candidate list by:
selecting, from each of the posting lists, a next content item having a next rank with a value lower than a previous rank value,
for each of the next content items,
if the next content item is not in the candidate list, inserting a new entry in the candidate list for the next content item with its content item identifier and its corresponding term score, and
if the next content item is in the candidate list, summing all available term scores associated with the next content item in all of the posting lists, wherein the rank values associated with the all available term scores in all of the posting lists are equal or higher than the next rank value, and re-ranking the candidate list based on the summed term scores of the next content item, and
repeating the step of selecting, inserting, summing, and re-ranking until the candidate list has been updated based on all of the one or more content items in each of the posting lists;
determining, based on the candidate list, the candidate content items; and
providing, based on the candidate content items, a response to the query.

2. The method of claim 1, wherein the step of generating the candidate list further comprises:
determining, for each posting list, a first posting list entry, wherein each posting list is analyzed using a separate one of the plurality of processors;
selecting a content item identifier associated with a first content item from the first posting list entry of each posting list; and
extracting a corresponding term score for the first posting list entry of each posting list.

3. The method of claim 2, further comprising:
determining whether a data object associated with the first content item identifier exists in a data structure; and
based on the determining, performing:
generating the data object in response to determining an absence of any data objects in the data structure that are associated with the content item identifier associated with the first content item, wherein the data object stores the content item identifier and the corresponding term score for the first posting list entry of a corresponding posting list; or
adding the corresponding term score of the content item identifier for the first posting list entry to the data structure in response to determining that the data object exists in the data structure.

4. The method of claim 1, further comprising:
determining, using a first processor of the plurality of processors, a first term score associated with a first content item of the one or more content items included in a first posting list of the plurality of posting lists, wherein the first content item is a first entry in the first posting list, and the first term score is greater than or equal to each additional term score included in the first posting list;
determining that a data object representative of the first content item in a data structure exists; and adding the first term score to the data object, wherein the data object comprises the first term score associated with the first posting list and at least a second term score associated with a second content item included in a second posting list, the second posting list being analyzed using a second processor of the plurality of processors.

5. The method of claim 4, further comprising:
determining an upper bound term score for each posting list; and
storing each upper bound term score in the data structure.

6. The method of claim 1, further comprising:
generating a content item map that stores a first listing of content item identifiers associated with each content item of the one or more content items analyzed from each posting list;
determining that the cleaning condition has been satisfied;
generating a temporary content item map that stores a second listing of content item identifiers comprising at least a portion of the first listing of content item identifiers, wherein the second listing of content item identifiers comprises content item identifiers having a corresponding lower bound term score that exceeds a threshold term score; and
performing a compare and swap ("CAS") operation to replace the first listing of content item identifiers with the second listing of content item identifiers.

7. A system comprising a plurality of processors, memory, and a communications platform in communication with a network for retrieving documents for a search, comprising:
a query decomposition unit configured to receive a query comprising a plurality of terms;
a plurality of query term based searchers each being configured to:
obtain, for each of the plurality of terms, a posting list of one or more content items ranked based on term scores associated with a corresponding one or more content items, wherein a term score is indicative of a level of relevance between a corresponding content item in the posting list and the term, and
generating a candidate list of content items based on the plurality of posting lists, wherein the step of generating the candidate list comprises:
selecting, from each of the posting lists, a first content item having a rank with a same first value in each of the posting lists,
retrieving, for each of the first content items, from the respective posting lists, an associated term score of the first content item, and
creating the candidate list with the first content items that are ranked based on their corresponding term scores;
updating the candidate list by:
selecting, from each of the posting lists, a next content item having a next rank with a value lower than a previous rank value,
for each of the next content items,
if the next content item is not in the candidate list, inserting a new entry in the candidate list for the next content item with its content item identifier and its corresponding term score, and
if the next content item is in the candidate list, summing all available term scores associated with the next content item in all of the posting lists, wherein the rank values associated with the all available term scores in all of the posting lists are equal or higher than the next rank value, and
re-ranking the candidate list based on the summed term scores of the next content item, and
repeating the step of selecting, inserting, summing, and re-ranking until the candidate list has been updated based on all of the one or more content items in each of the posting lists;
determining, based on the candidate list, the candidate content items; and
a query search result aggregator configured to provide, based on the candidate content items, a response to the query.

8. The system of claim 7,
wherein the query decomposition unit comprises a posting list selector configured to determine, for a posting list, a first posting list entry, wherein each query term based searcher of the plurality of query term based searchers uses a separate one or more processors of the plurality of processors; and
each query term based searcher comprises:
a posting list reader/monitor configured to:
select a content item identifier associated with a first content item from the first posting list entry of each posting list, and
extract a corresponding term score for the first posting list entry of each posting list.

9. The system of claim 8, wherein the data object generator/updater is configured to:
determine whether a data object associated with the first content item identifier exists in a data structure; and
based on the determining, performing:
generating the data object in response to determining an absence of any data objects in the data structure that are associated with the content item identifier associated with the first content item, wherein the data object stores the content item identifier and the corresponding term score for the first posting list entry of a corresponding posting list; or
adding the corresponding term score of the content item identifier for the first posting list entry to the data structure in response to determining that the data object exists in the data structure.

10. The system of claim 7, wherein each query term based search comprises:
a posting list reader/monitor configured to determine, using a first processor of the plurality of processors, a first term score associated with a first content item of the one or more content items included in a first posting list of the plurality of posting lists, wherein the first content item is a first entry in the first posting list, and the first term score is greater than or equal to each additional term score included in the first posting list;
a data object generator/updater configured to:
determine that a data object representative of the first content item in a data structure exists, and
add the first term score to the data object, wherein the data object comprises the first term score associated with the first posting list and at least a second term score associated with a second content item included in a second posting list, the second posting list being analyzed using a second processor of the plurality of processors.

11. The system of claim 10, wherein each query term based search further comprises:
a term score upper bound identifier configured to:
determine an upper bound term score for each posting list, and
store each upper bound term score in the data structure.

12. The system of claim 7, wherein each query term based searcher comprises a term list cleaning unit configured to:
  generate a content item map that stores a first listing of content item identifiers associated with each content item of the one or more content items analyzed from each posting list;
  determine that the cleaning condition has been satisfied;
  generate a temporary content item map that stores a second listing of content item identifiers comprising at least a portion of the first listing of content item identifiers, wherein the second listing of content item identifiers comprises content item identifiers having a corresponding lower bound term score that exceeds a threshold term score; and
  perform a compare and swap ("CAS") operation to replace the first listing of content item identifiers with the second listing of content item identifiers.

13. A non-transitory computer readable medium comprising instructions for retrieving content items for a search that, when executed by one or more of a plurality of processors, cause a computing device to perform operations comprising:
  receiving a query comprising a plurality of terms;
  obtaining, for each of the plurality of terms, a posting list of one or more content items ranked based on term scores associated with a corresponding one or more content items, wherein a term score is indicative of a level of relevance between a corresponding content item in the posting list and the term;
  generating a candidate list of content items based on the plurality of posting lists, wherein the step of generating the candidate list comprises:
    selecting, from each of the posting lists, a first content item having a rank with a same first value in each of the posting lists,
    retrieving, for each of the first content items, from the respective posting lists, an associated term score of the first content item, and
    creating the candidate list with the first content items that are ranked based on their corresponding term scores;
  updating the candidate list by:
    selecting, from each of the posting lists, a next content item having a next rank with a value lower than a previous rank value,
    for each of the next content items,
      if the next content item is not in the candidate list, inserting a new entry in the candidate list for the next content item with its content item identifier and its corresponding term score, and
      if the next content item is in the candidate list, summing all available term scores associated with the next content item in all of the posting lists, wherein the rank values associated with the all available term scores in all of the posting lists are equal or higher than the next rank value, and re-ranking the candidate list based on the summed term scores of the next content item, and
    repeating the step of selecting, inserting, summing, and re-ranking until the candidate list has been updated based on all of the one or more content items in each of the posting lists;
  determining, based on the candidate list, the candidate content items; and
  providing, based on the candidate content items, a response to the query.

14. The non-transitory computer readable medium of claim 13, wherein the step of generating the candidate list further comprises:
  determining, for each posting list, a first posting list entry, wherein each posting list is analyzed using a separate one of the plurality of processors;
  selecting a content item identifier associated with a first content item from the first posting list entry of each posting list; and
  extracting a corresponding term score for the first posting list entry of each posting list.

15. The non-transitory computer readable medium of claim 14, wherein the operations comprise:
  determining whether a data object associated with the first content item identifier exists in a data structure; and
  based on the determining, performing:
    generating the data object in response to determining an absence of any data objects in the data structure that are associated with the content item identifier associated with the first content item, wherein the data object stores the content item identifier and the corresponding term score for the first posting list entry of a corresponding posting list; or
    adding the corresponding term score of the content item identifier for the first posting list entry to the data structure in response to determining that the data object exists in the data structure.

16. The non-transitory computer readable medium of claim 15, wherein the operations further comprise:
  determining, using a first processor of the plurality of processors, a first term score associated with a first content item of the one or more content items included in a first posting list of the plurality of posting lists, wherein the first content item is a first entry in the first posting list, and the first term score is greater than or equal to each additional term score included in the first posting list;
  determining that a data object representative of the first content item in a data structure exists; and
  adding the first term score to the data object, wherein the data object comprises the first term score associated with the first posting list and at least a second term score associated with a second content item included in a second posting list, the second posting list being analyzed using a second processor of the plurality of processors.

17. The non-transitory computer readable medium of claim 15, wherein the operations further comprise:
  generating a content item map that stores a first listing of content item identifiers associated with each content item of the one or more content items analyzed from each posting list;
  determining that the cleaning condition has been satisfied;
  generating a temporary content item map that stores a second listing of content item identifiers comprising at least a portion of the first listing of content item identifiers, wherein the second listing of content item identifiers comprises content item identifiers having a corresponding lower bound term score that exceeds a threshold term score; and
  performing a compare and swap ("CAS") operation to replace the first listing of content item identifiers with the second listing of content item identifiers.

18. The method of claim 1, wherein:
a lower bound term score is computed based on a term score associated with each instance of the content item identifier encountered during a current iteration and prior iterations; and
an upper bound term score is computed based on (i) a term score associated with each instance of the content item identifier encountered during a current iteration and prior iterations and (ii) a term score associated with a content item identifier in each other posting list with which the content item identifier has not yet been encountered.

19. The system of claim 7, wherein the term score comprises one or more of a lower bound term score or a higher bound term score.

20. The non-transitory computer readable medium of claim 13, wherein the term score comprises one or more of a lower bound term score or a higher bound term score.

\* \* \* \* \*